United States Patent
Saiki et al.

(10) Patent No.: US 8,422,080 B2
(45) Date of Patent: Apr. 16, 2013

(54) IMAGE PROCESSING APPARATUS AND IMAGE PROCESSING METHOD IN WHICH COMPOSITE TONE PIXEL DATA IS PROVIDED BASED ON TONE PIXEL DATA GENERATED BY ERROR DIFFUSION PROCESSING AND DITHER PROCESSING

(75) Inventors: Tomoyuki Saiki, Suntou-gun (JP); Go Araki, Suntou-gun (JP); Yuuji Takayama, Suntou-gun (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 738 days.

(21) Appl. No.: 12/646,751

(22) Filed: Dec. 23, 2009

(65) Prior Publication Data

US 2010/0171988 A1    Jul. 8, 2010

(30) Foreign Application Priority Data

Jan. 6, 2009   (JP) ................ 2009-001107

(51) Int. Cl.
*H04N 1/40*    (2006.01)

(52) U.S. Cl.
USPC ....... 358/3.03; 358/3.02; 358/3.04; 358/3.05; 358/3.14

(58) Field of Classification Search .......... None
See application file for complete search history.

(56) References Cited

FOREIGN PATENT DOCUMENTS

| JP | 04040071 A | * | 2/1992 |
|---|---|---|---|
| JP | 2570890 B | | 1/1997 |
| JP | 2621865 | | 6/1997 |
| JP | 2000-155-561 A | | 6/2000 |
| JP | 2000155561 A | * | 6/2000 |

OTHER PUBLICATIONS

"An Adaptive Algorithm for Spatial Grey Scale" in Society for Information Display 1975 Symposium Digest of Technical Papers, 1975, p. 36-37, Robert Floyd, et al.

* cited by examiner

*Primary Examiner* — Twyler Haskins
*Assistant Examiner* — Christopher D Wait
(74) *Attorney, Agent, or Firm* — Cowan, Liebowitz & Latman, P.C.

(57) ABSTRACT

An image processing apparatus 101 that generates output image data based on multi-level image data is provided with an error diffusion processing unit 104 that generates tone pixel data from the pixel-of-interest data according to an error diffusion method, a dither processing unit 103 that generates tone pixel data from the pixel-of-interest data according to a dither processing method, an allotment ratio determination unit 105 that increases the allotment ratio with respect to the error diffusion method as the difference between the maximum density and the minimum density increases, and a composition unit 109 that composites the tone pixel data for a pixel of interest that has been generated by the error diffusion processing unit 104 and the dither processing unit 103 according to the allotment ratios determined by the allotment ratio determination unit 105, and outputs the composited data as pixel data of the output image data.

5 Claims, 20 Drawing Sheets

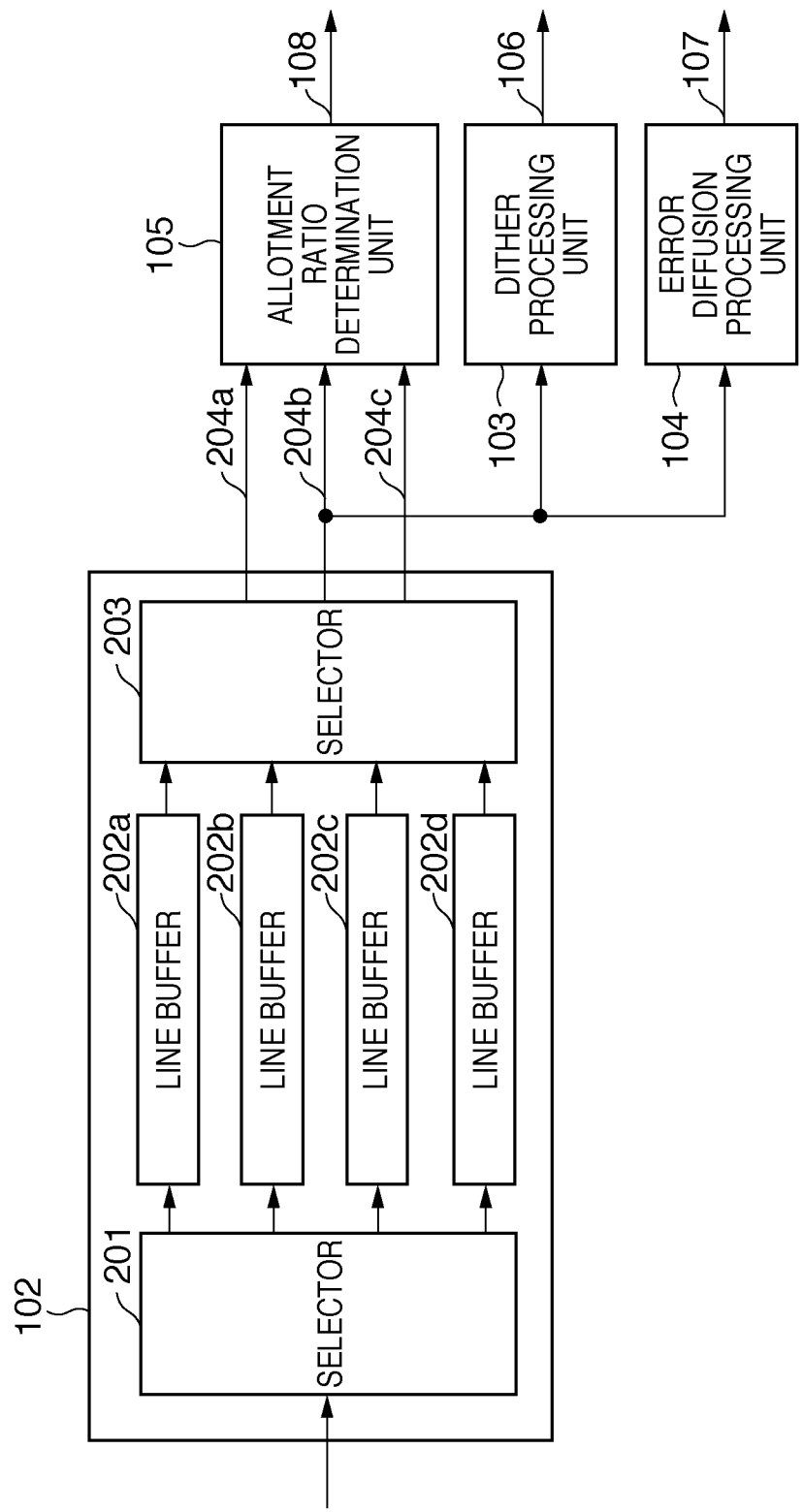

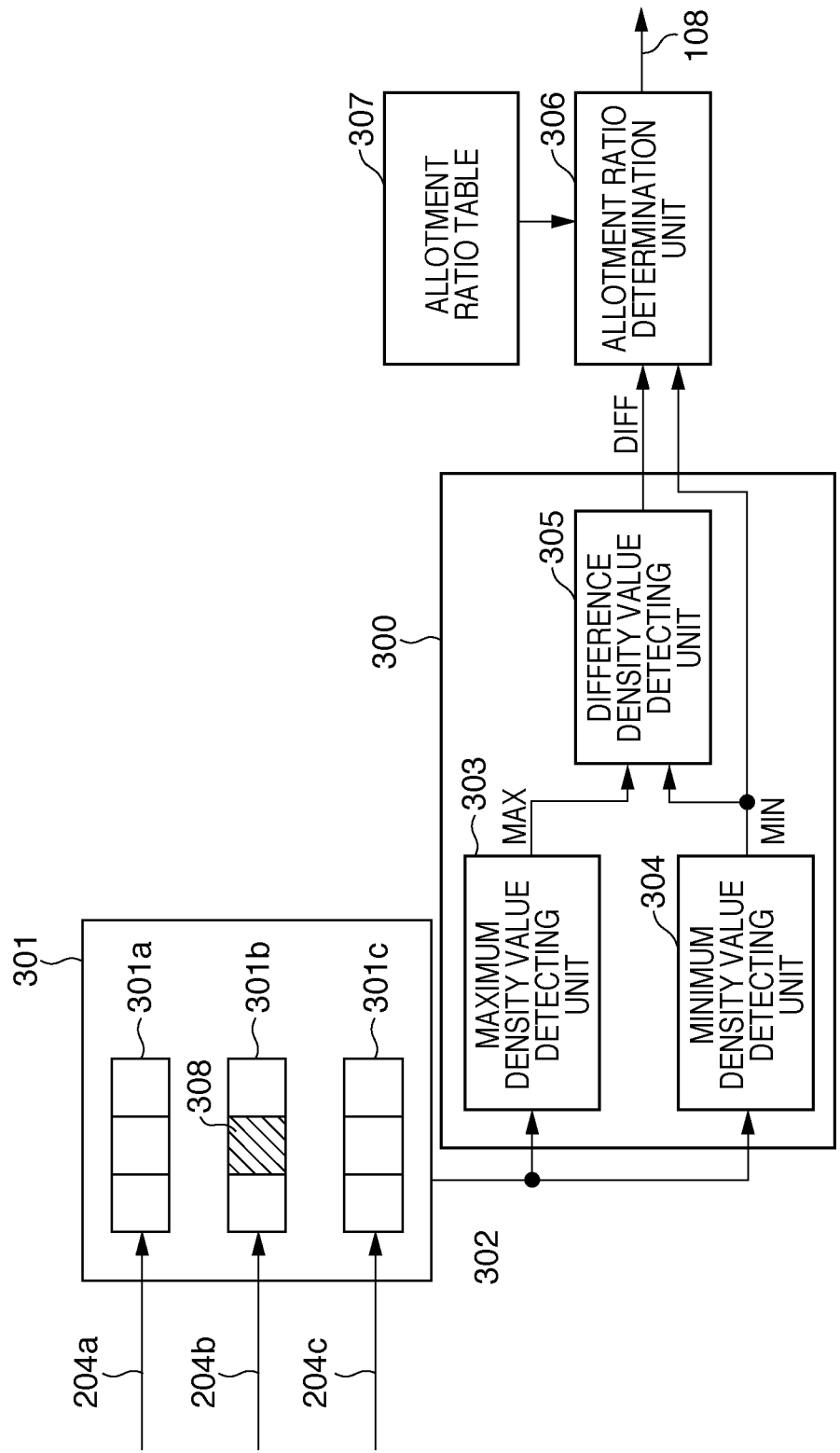

408a — □ DENSITY VALUE 0
408b — ▨ DENSITY VALUE 255
408c — ◨ DENSITY VALUE 1~127
408d — ▧ DENSITY VALUE 128~254

408a — □ DENSITY VALUE 0
408b — ▨ DENSITY VALUE 255
408c — ◨ DENSITY VALUE 1~127
408d — ▧ DENSITY VALUE 128~254

408a— ☐ DENSITY VALUE 0
408b— ▨ DENSITY VALUE 255
408c— ◳ DENSITY VALUE 1~127
408d— ▧ DENSITY VALUE 128~254

408a— ☐ DENSITY VALUE 0
408b— ▨ DENSITY VALUE 255
408c— ◳ DENSITY VALUE 1~127
408d— ▧ DENSITY VALUE 128~254

408a — ☐ DENSITY VALUE 0
408b — ▨ DENSITY VALUE 255
408c — ◳ DENSITY VALUE 1~127
408d — ▧ DENSITY VALUE 128~254

408a — ☐ DENSITY VALUE 0
408b — ▨ DENSITY VALUE 255
408c — ◳ DENSITY VALUE 1~127
408d — ▧ DENSITY VALUE 128~254

408a — ☐ DENSITY VALUE 0
408b — ▥ DENSITY VALUE 255
408c — ◨ DENSITY VALUE 1~127
408d — ▨ DENSITY VALUE 128~254

| 0 | 0 | 0 | 0 | 0 | 0 | 0 | 127 | 129 | 129 |
|---|---|---|---|---|---|---|---|---|---|
| 0 | 0 | 0 | 0 | 0 | 0 | 128 | 128 | 129 | 129 |
| 0 | 0 | 0 | 0 | 0 | 121 | 128 | 128 | 131 | 131 |
| 0 | 0 | 0 | 0 | 128 | 129 | 129 | 129 | 131 | 131 |
| 0 | 0 | 0 | 129 | 129 | 129 | 129 | 132 | 133 | 133 |
| 0 | 0 | 124 | 134 | 134 | 134 | 129 | 132 | 133 | 133 |
| 0 | 121 | 124 | 134 | 134 | 134 | 123 | 132 | 133 | 133 |
| 125 | 125 | 125 | 134 | 134 | 134 | 126 | 130 | 130 | 130 |
| 125 | 125 | 125 | 130 | 131 | 131 | 132 | 132 | 132 | 131 |
| 125 | 125 | 125 | 130 | 131 | 131 | 132 | 132 | 132 | 131 |

—703

| 0 | 0 | 0 | 0 | 0 | 0 | 0 | 0 | 0 | 0 |
|---|---|---|---|---|---|---|---|---|---|
| 0 | 0 | 0 | 0 | 0 | 0 | 0 | 0 | 0 | 0 |
| 0 | 0 | 0 | 0 | 0 | 0 | 0 | 0 | 0 | 121 |
| 0 | 0 | 0 | 0 | 0 | 0 | 0 | 0 | 117 | 121 |
| 0 | 0 | 0 | 0 | 0 | 0 | 0 | 117 | 117 | 123 |
| 0 | 0 | 0 | 0 | 0 | 0 | 119 | 119 | 119 | 123 |
| 0 | 0 | 0 | 0 | 0 | 120 | 119 | 119 | 119 | 124 |
| 0 | 0 | 0 | 0 | 120 | 120 | 120 | 120 | 121 | 124 |
| 0 | 0 | 0 | 119 | 121 | 120 | 120 | 120 | 122 | 124 |
| 0 | 0 | 119 | 119 | 121 | 121 | 121 | 122 | 122 | 124 |

—704

| 0 | 0 | 0 | 0 | 0 | 0 | 0 | 127 | 129 | 129 |
|---|---|---|---|---|---|---|---|---|---|
| 0 | 0 | 0 | 0 | 0 | 0 | 128 | 128 | 129 | 129 |
| 0 | 0 | 0 | 0 | 0 | 121 | 128 | 128 | 131 | 10 |
| 0 | 0 | 0 | 0 | 128 | 129 | 129 | 129 | 14 | 10 |
| 0 | 0 | 0 | 129 | 129 | 129 | 129 | 15 | 16 | 10 |
| 0 | 0 | 124 | 134 | 134 | 134 | 10 | 13 | 14 | 10 |
| 0 | 121 | 124 | 134 | 134 | 14 | 4 | 13 | 14 | 9 |
| 125 | 125 | 125 | 134 | 14 | 14 | 6 | 10 | 9 | 6 |
| 125 | 125 | 125 | 11 | 10 | 11 | 12 | 12 | 10 | 7 |
| 125 | 125 | 6 | 11 | 10 | 10 | 11 | 10 | 10 | 7 |

—705

| 1.000 | 1.000 | 1.000 | 1.000 | 1.000 | 1.000 | 1.000 | 0.086 | 0.086 | 0.086 |
|---|---|---|---|---|---|---|---|---|---|
| 1.000 | 1.000 | 1.000 | 1.000 | 1.000 | 1.000 | 0.086 | 0.086 | 0.086 | 0.086 |
| 1.000 | 1.000 | 1.000 | 1.000 | 1.000 | 0.143 | 0.086 | 0.086 | 0.086 | 0.957 |
| 1.000 | 1.000 | 1.000 | 1.000 | 0.086 | 0.086 | 0.086 | 0.086 | 0.914 | 0.957 |
| 1.000 | 1.000 | 1.000 | 0.086 | 0.086 | 0.086 | 0.086 | 0.914 | 0.914 | 0.957 |
| 1.000 | 1.000 | 0.086 | 0.029 | 0.029 | 0.029 | 0.957 | 0.914 | 0.914 | 0.957 |
| 1.000 | 0.143 | 0.086 | 0.029 | 0.029 | 0.914 | 0.957 | 0.914 | 0.914 | 0.957 |
| 0.086 | 0.086 | 0.086 | 0.029 | 0.914 | 0.914 | 0.957 | 0.957 | 0.957 | 0.957 |
| 0.086 | 0.086 | 0.086 | 0.957 | 0.957 | 0.957 | 0.914 | 0.914 | 0.957 | 0.957 |
| 0.086 | 0.086 | 0.957 | 0.957 | 0.957 | 0.957 | 0.957 | 0.957 | 0.957 | 0.957 |

| 0 | 0 | 0 | 0 | 0 | 0 | 0 | 0 | 0 | 197 |
|---|---|---|---|---|---|---|---|---|---|
| 0 | 0 | 0 | 0 | 0 | 0 | 0 | 0 | 176 | 197 |
| 0 | 0 | 0 | 0 | 0 | 0 | 0 | 197 | 176 | 0 |
| 0 | 0 | 0 | 0 | 0 | 0 | 197 | 197 | 16 | 8 |
| 0 | 0 | 0 | 0 | 0 | 176 | 197 | 233 | 250 | 0 |
| 0 | 0 | 0 | 0 | 194 | 187 | 0 | 16 | 250 | 244 |
| 0 | 0 | 0 | 194 | 194 | 16 | 8 | 0 | 250 | 252 |
| 0 | 0 | 176 | 194 | 233 | 250 | 0 | 8 | 8 | 244 |
| 0 | 194 | 176 | 0 | 8 | 252 | 233 | 159 | 0 | 8 |
| 197 | 197 | 0 | 8 | 8 | 244 | 252 | 252 | 8 | 8 |

—708

408a — ☐ DENSITY VALUE 0
408b — ▨ DENSITY VALUE 255
408c — ◪ DENSITY VALUE 1~127
408d — ▧ DENSITY VALUE 128~254

| 0 | 111 | 122 | 0 | 114 | 119 | 0 | 0 | 0 |
|---|-----|-----|---|-----|-----|---|---|---|
| 0 | 0 | 0 | 0 | 128 | 117 | 0 | 114 | 122 |
| 145 | 0 | 0 | 0 | 0 | 0 | 117 | 131 | 0 |
| 142 | 0 | 119 | 126 | 0 | 0 | 0 | 0 | 0 |
| 0 | 0 | 127 | 125 | 0 | 111 | 114 | 0 | 0 |
| 0 | 0 | 0 | 0 | 108 | 117 | 0 | 117 | 114 |
| 128 | 131 | 0 | 0 | 0 | 0 | 0 | 125 | 114 |
| 134 | 125 | 0 | 119 | 122 | 0 | 0 | 0 | 0 |
| 0 | 0 | 0 | 114 | 122 | 0 | 117 | 125 | 0 |
| 0 | 0 | 0 | 0 | 0 | 119 | 134 | 0 | 125 |

801

408a — □ DENSITY VALUE 0
408b — ▨ DENSITY VALUE 255
408c — ◩ DENSITY VALUE 1~127
408d — ▨ DENSITY VALUE 128~254

802

408a — □ DENSITY VALUE 0
408b — ▨ DENSITY VALUE 255
408c — ◩ DENSITY VALUE 1~127
408d — ▨ DENSITY VALUE 128~254

| 0 | 111 | 122 | 0 | 114 | 119 | 0 | 0 | 0 | 0 |
|---|---|---|---|---|---|---|---|---|---|
| 0 | 0 | 0 | 0 | 128 | 117 | 0 | 114 | 122 | 0 |
| 145 | 0 | 0 | 0 | 0 | 0 | 0 | 117 | 131 | 0 |
| 142 | 0 | 119 | 126 | 0 | 0 | 0 | 0 | 0 | 0 |
| 0 | 0 | 127 | 125 | 0 | 111 | 114 | 0 | 0 | 0 |
| 0 | 0 | 0 | 0 | 0 | 108 | 117 | 0 | 117 | 114 |
| 128 | 131 | 0 | 0 | 0 | 0 | 0 | 0 | 125 | 114 |
| 134 | 125 | 0 | 119 | 122 | 0 | 0 | 0 | 0 | 0 |
| 0 | 0 | 0 | 114 | 122 | 0 | 117 | 125 | 0 | 0 |
| 0 | 0 | 0 | 0 | 0 | 119 | 134 | 0 | 125 | |

801

408a — ☐ DENSITY VALUE 0  
408b — ▨ DENSITY VALUE 255  
408c — ◨ DENSITY VALUE 1~127  
408d — ▨ DENSITY VALUE 128~254

| 0 | 0 | 255 | 0 | 255 | 0 | 0 | 0 | 0 | 0 |
|---|---|---|---|---|---|---|---|---|---|
| 0 | 0 | 0 | 0 | 0 | 0 | 0 | 255 | 255 | 0 |
| 255 | 0 | 0 | 0 | 0 | 0 | 0 | 255 | 64 | 0 |
| 255 | 0 | 0 | 0 | 0 | 0 | 0 | 0 | 0 | 0 |
| 0 | 0 | 0 | 0 | 0 | 255 | 255 | 0 | 0 | 0 |
| 0 | 0 | 0 | 0 | 0 | 0 | 0 | 0 | 64 | 255 |
| 0 | 0 | 0 | 0 | 0 | 0 | 0 | 0 | 255 | 255 |
| 0 | 255 | 0 | 255 | 0 | 0 | 0 | 0 | 0 | 0 |
| 0 | 0 | 0 | 0 | 0 | 255 | 255 | 0 | 0 | 0 |
| 0 | 0 | 0 | 0 | 0 | 255 | 255 | 0 | 0 | 0 |

802

408a — ☐ DENSITY VALUE 0  
408b — ▨ DENSITY VALUE 255  
408c — ◨ DENSITY VALUE 1~127  
408d — ▨ DENSITY VALUE 128~254

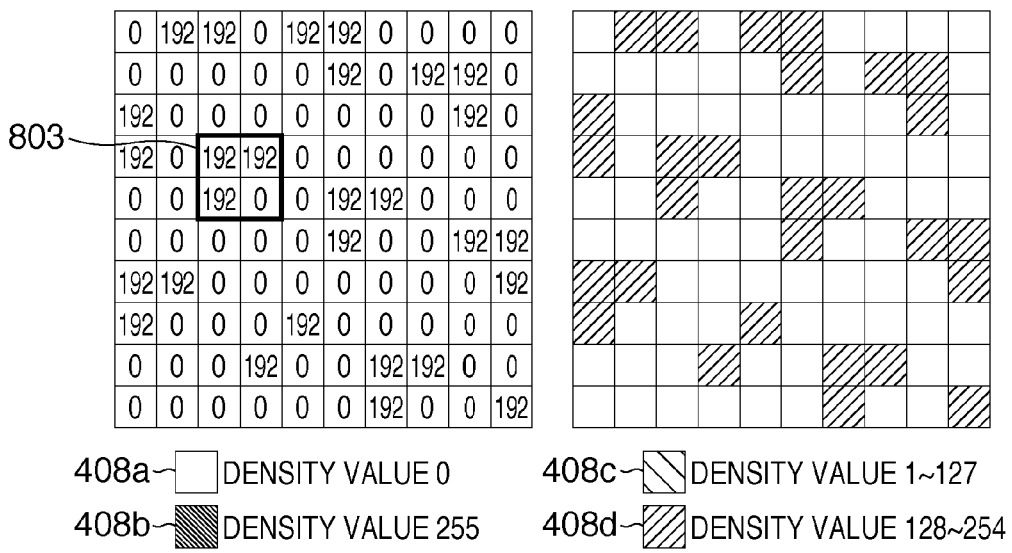

| 111 | 122 | 122 | 128 | 128 | 128 | 119 | 122 | 122 | 122 |
|---|---|---|---|---|---|---|---|---|---|
| 145 | 145 | 122 | 128 | 128 | 128 | 119 | 131 | 131 | 131 |
| 145 | 145 | 126 | 128 | 128 | 128 | 117 | 131 | 131 | 131 |
| 145 | 145 | 127 | 127 | 126 | 114 | 117 | 131 | 131 | 131 |
| 142 | 142 | 127 | 127 | 126 | 117 | 117 | 117 | 117 | 117 |
| 131 | 131 | 131 | 127 | 125 | 117 | 117 | 125 | 125 | 125 |
| 134 | 134 | 131 | 122 | 122 | 122 | 117 | 125 | 125 | 125 |
| 134 | 134 | 131 | 122 | 122 | 122 | 125 | 125 | 125 | 125 |
| 134 | 134 | 125 | 122 | 122 | 122 | 134 | 134 | 134 | 125 |
| 0 | 0 | 114 | 122 | 122 | 122 | 134 | 134 | 134 | 125 |

| 0.200 | 0.143 | 0.143 | 0.086 | 0.086 | 0.086 | 0.143 | 0.143 | 0.143 | 0.143 |
|---|---|---|---|---|---|---|---|---|---|
| 0.000 | 0.000 | 0.143 | 0.086 | 0.086 | 0.086 | 0.143 | 0.086 | 0.086 | 0.086 |
| 0.000 | 0.000 | 0.086 | 0.086 | 0.086 | 0.086 | 0.143 | 0.086 | 0.086 | 0.086 |
| 0.000 | 0.000 | 0.086 | 0.086 | 0.086 | 0.200 | 0.143 | 0.086 | 0.086 | 0.086 |
| 0.000 | 0.000 | 0.086 | 0.086 | 0.086 | 0.143 | 0.143 | 0.143 | 0.143 | 0.143 |
| 0.086 | 0.086 | 0.086 | 0.086 | 0.086 | 0.143 | 0.143 | 0.086 | 0.086 | 0.086 |
| 0.029 | 0.029 | 0.086 | 0.143 | 0.143 | 0.143 | 0.143 | 0.086 | 0.086 | 0.086 |
| 0.029 | 0.029 | 0.086 | 0.143 | 0.143 | 0.143 | 0.086 | 0.086 | 0.086 | 0.086 |
| 0.029 | 0.029 | 0.086 | 0.143 | 0.143 | 0.143 | 0.029 | 0.029 | 0.029 | 0.086 |
| 1.000 | 1.000 | 0.200 | 0.143 | 0.143 | 0.143 | 0.029 | 0.029 | 0.029 | 0.086 |

408a — □ DENSITY VALUE 0   408c — ◩ DENSITY VALUE 1~127
408b — ▨ DENSITY VALUE 255   408d — ▧ DENSITY VALUE 128~254

IMAGE PROCESSING APPARATUS AND IMAGE PROCESSING METHOD IN WHICH COMPOSITE TONE PIXEL DATA IS PROVIDED BASED ON TONE PIXEL DATA GENERATED BY ERROR DIFFUSION PROCESSING AND DITHER PROCESSING

BACKGROUND OF THE INVENTION

1. Field of the Invention

The present invention relates to an image processing apparatus and an image processing method for performing digital processing on an input image and outputting density data to an output apparatus.

2. Description of the Related Art

Generally, digital image processing apparatuses such as digital copying apparatuses that reproduce images by outputting digitized image data from digital printers, such as laser beam printers, have become widespread instead of conventional analog image processing apparatuses due to the development of digital equipment. These digital image processing apparatuses generally adopt a method for performing tone reproduction through halftone processing, such as processing using a dither processing method, in order to reproduce halftones.

Although tone reproduction using a dither processing method is favorable for a portion having few high frequency components as with a flat portion, there has been a problem in that breaks called jaggies occur in a character/thin line portion. This is due to a cycle that a dither has interfering with high frequency components included in an input image (in particular, a cyclic pattern similar to the dither cycle) so as to cause a cyclic fringe pattern called a moire phenomenon to occur.

To address this, there is an error diffusion method as a tone reproduction technique other than the dither processing method. This technique is a technique in which the density difference (quantization error) between a pixel density of input image data and an output pixel density is calculated for each pixel, and after performing specific weighting on the quantization error, which is the result of this calculation, the quantization error is diffused to the peripheral pixels of a pixel of interest (e.g., see "An Adaptive Algorithm for Spatial Grey Scale" in Society for Information Display 1975 Symposium Digest of Technical Papers, 1975, p. 36 (Document 1)). This technique makes it possible to obtain an output image that does not have cyclicity, and has a high resolution, and accordingly the moire phenomenon and jaggies in a character/thin line portion do not occur.

However, this error diffusion method has problems, such as a distinctive fringe pattern (texture) occurring in an output image, or granular noise being noticeable in the highlight portion and dark portion of an image in electrophotographs. As a technique for suppressing image deterioration that occurs with this dither processing method and error diffusion method, and precisely reproducing a high quality image, there is a method in which tone reproduction is performed on input images using a dither processing method and an error diffusion method, the processing is switched based on the type of the images, and the resultant images are outputted (e.g., see Japanese Patent No. 2621865 (Document 2)).

However, as with the technology disclosed in Document 2, in the processing for switching between dither processing and error diffusion processing based on a threshold value, due to slight density variations in image data, processing may be frequently switched in the vicinity of a boundary (a portion in which a determination value is close to the threshold value), which causes deterioration of image quality. Further, since a dot structure changes drastically in a portion in which processing is switched, a sense of unnaturalness may be given particularly in a case of nature images. Although it is possible to cope with these problems by setting appropriate threshold values, it is difficult to set appropriate threshold values for the entire inputted image, thus requiring the addition of complicated processing.

SUMMARY OF THE INVENTION

The present invention provides an image processing apparatus and an image processing method that suppress deterioration of image quality in a boundary portion between regions in image data by performing simple control.

According to one aspect of the present invention, there is provided an image processing apparatus that generates output image data based on multi-level image data, comprising: a calculation unit configured to calculate a maximum density and a minimum density in a pixel block that includes pixel-of-interest data in the multi-level image data and that is constituted from a prescribed number of pixels; an error diffusion processing unit configured to generate tone pixel data from the pixel-of-interest data according to an error diffusion method; a dither processing unit configured to generate tone pixel data from the pixel-of-interest data according to a dither processing method; an allotment ratio determination unit configured to determine an allotment ratio of the error diffusion method and an allotment ratio of the dither processing method based on the maximum density and the minimum density that have been calculated by the calculation unit; and a composition unit configured to composite the tone pixel data for a pixel of interest that has been generated by the error diffusion processing unit and the dither processing unit according to the allotment ratios determined by the allotment ratio determination unit, and output the composited data as pixel data of the output image data, wherein the allotment ratio determination unit increases the allotment ratio with respect to the error diffusion method as a difference between the maximum density and the minimum density increases.

According to another aspect of the present invention, there is provided an image processing method for generating output image data based on multi-level image data, comprising: a calculation step of calculating a maximum density and a minimum density in a pixel block that includes pixel-of-interest data in the multi-level image data and that is constituted from a prescribed number of pixels; an error diffusion processing step of generating tone pixel data from the pixel-of-interest data according to an error diffusion method; a dither processing step of generating tone pixel data from the pixel-of-interest data according to a dither processing method; an allotment ratio determination step of determining an allotment ratio of the error diffusion method and an allotment ratio of the dither processing method based on the maximum density and the minimum density that have been calculated in the calculation step; and a composition step of compositing the tone pixel data for a pixel of interest that has been generated in the error diffusion processing step and the dither processing step according to the allotment ratios determined in the allotment ratio determination step, and outputting the composited data as pixel data of the output image data, wherein in the allotment ratio determination step, the allotment ratio with respect to the error diffusion method is increased as a difference between the maximum density and the minimum density increases.

According to the present invention, it is possible to provide an image processing apparatus and an image processing method that suppress deterioration of image quality in a boundary portion between regions in image data by performing simple control.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a block diagram showing the functional configuration of a buffer 102.

FIG. 3 is a block diagram showing the functional configuration of a calculation unit 300 and an allotment ratio determination unit 306.

FIG. 9C is a diagram showing image data obtained by performing error diffusion processing on the input image data shown in FIG. 9A.

FIG. 9D is a diagram showing a maximum density value MAX for each pixel.

FIG. 9E is a diagram showing a minimum density value MIN for each pixel.

DESCRIPTION OF THE EMBODIMENTS

Hereinafter, embodiments of the present invention are described in detail with reference to the attached drawings. It should be noted that the embodiments described below are examples of means for realizing the present invention and, thus, the present invention can be applied to an embodiment obtained by modifying or changing an embodiment below without departing from the scope of the present invention.

First Embodiment

Figure 1:
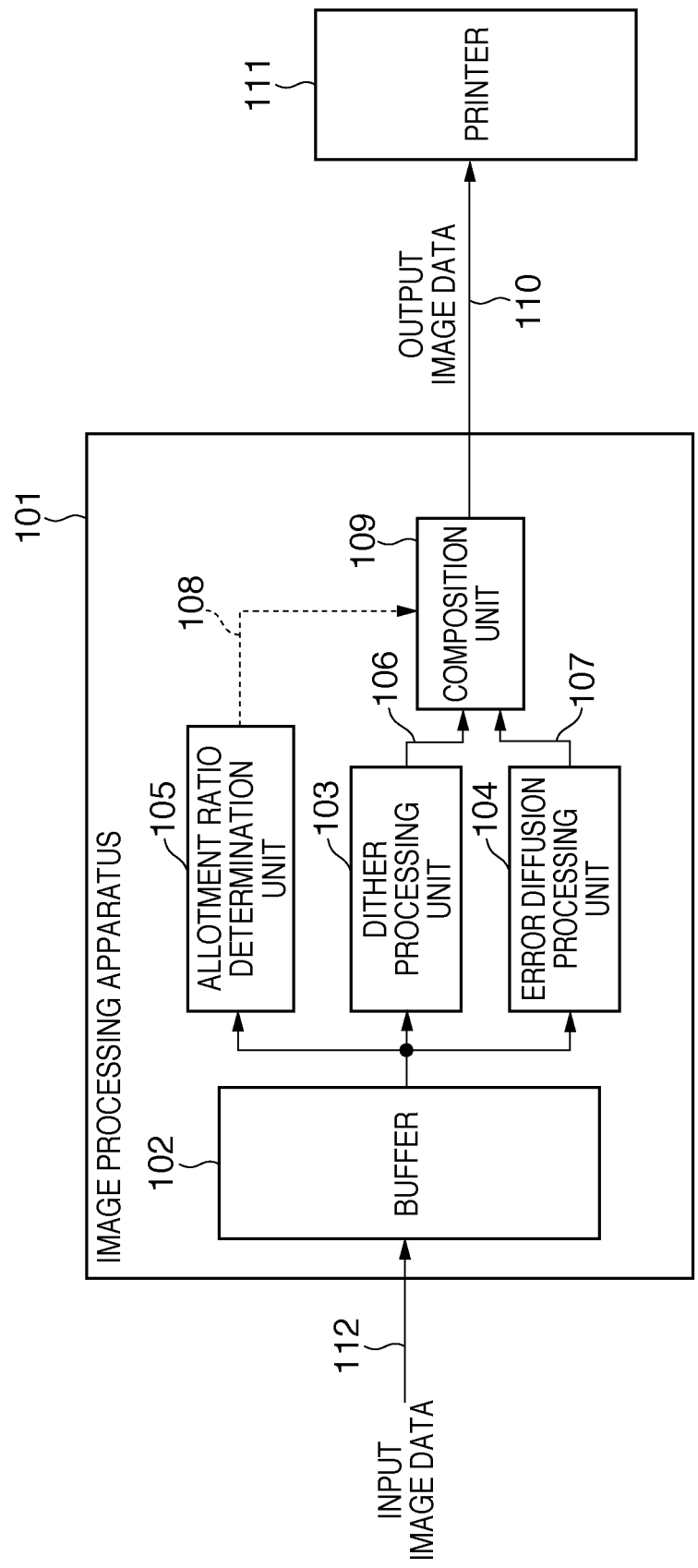
FIG. 1 is a block diagram showing the functional configuration of an image processing apparatus according to a first embodiment of the present invention.

FIG. 1 is a block diagram showing the functional configuration of an image processing apparatus according to a first embodiment of the present invention. Reference numeral 101 denotes an image processing apparatus according to the present invention, reference numeral 102 denotes a buffer, reference numeral 103 denotes a dither processing unit, reference numeral 104 denotes an error diffusion processing unit, reference numeral 105 denotes an allotment ratio determination unit, reference numeral 109 denotes a composition unit, and reference numeral 111 denotes a printer. The image processing apparatus 101 is an apparatus that generates output image data based on multi-level image data.

Input image data received from an external apparatus (not shown) (e.g., a computer device, a controller, or an original reader) or the like is inputted from an input terminal 112. The buffer 102 once accumulates the input image data, and stores data for a plurality of lines. Note that in the present embodiment, a description is given assuming that the buffer has capacity for storing image data for four lines that expresses pixels in 8 bits.

The image data accumulated in the buffer 102 is inputted to each of the dither processing unit 103, the error diffusion processing unit 104, and the allotment ratio determination unit 105, in raster order.

The dither processing unit 103 generates tone pixel data 106 from pixel-of-interest data included in input image data, according to a dither processing method. The error diffusion processing unit 104 generates tone pixel data 107 from pixel-of-interest data included in input image data, according to an error diffusion method.

The allotment ratio determination unit 105 determines allotment ratios based on input image data, and outputs allotment ratio instruction information 108. The composition unit 109 composites the image data 106 outputted by the dither processing unit 103 and the image data 107 outputted by the error diffusion processing unit 104 according to the allotment ratio instruction information 108, and outputs the resultant data to the printer 111 from an output terminal 110 as output image data.

The printer 111 is a laser beam printer, for example, and according to output image data, determines a laser irradiation time period for each pixel, and performs image formation. Further, if the printer 111 is an LED printer using an LED array, the printer 111 determines an LED irradiation time period, and performs image formation.

FIG. 2 is a block diagram showing the functional configuration of the buffer 102. The buffer 102 accumulates image data for four lines in line buffers 202a to 202d selected by a selector 201. The line buffers 202a to 202d constitute a four-line ring buffer, and data is stored in any one of the line buffers 202a to 202d, and is read out from the other three line buffers through a selector 203.

Image data in the first line of input image data is accumulated in the line buffer 202a, and image data in the second line is accumulated in the line buffer 202b. Similarly, image data in the third and fourth lines are accumulated in the line buffers 202c and 202d in the stated order. When image data in the fourth line is stored, the selector 203 selects the line buffers 202a, 202b, and 202c, reads out data for three lines from the line heads, and outputs the read-out data to the allotment ratio determination unit 105. Meanwhile, of the data for three lines, data in the line positioned in the center is also inputted to the dither processing unit 103 and the error diffusion processing unit 104.

Image data in the fifth line is again accumulated in the line buffer 202a, and the selector 203 selects the line buffers 202b, 202c, and 202d, reads out data for three lines from the line heads, and outputs the read-out data to the allotment ratio determination unit 105. The data in the line buffer 202c is also inputted to the dither processing unit 103 and the error diffusion processing unit 104. Henceforth, processing is performed similarly.

FIG. 3 is a block diagram showing the functional configuration of a calculation unit 300 and an allotment ratio determination unit 306. Image data inputted from the buffer 102 through signal lines 204a to 204c is accumulated in a buffer 301. The buffer 301 has three shift registers 301a to 301c that can accumulate image data for three pixels. Therefore, the buffer 301 can accumulate image data for nine pixels. Here, assume that a pixel positioned in the center is a pixel of interest 308.

Image data for nine pixels accumulated in the buffer 301 is inputted to a maximum density value detecting unit 303 and a minimum density value detecting unit 304 through a signal line 302. The maximum density value detecting unit 303 detects a maximum density value MAX in the image data for nine pixels, and outputs the value to a difference density value detecting unit 305.

The minimum density value detecting unit 304 detects a minimum density value MIN in the image data for nine pixels, and outputs the value to the difference density value detecting unit 305 and the allotment ratio determination unit 306. The difference density value detecting unit 305 calculates a difference density value DIFF between the maximum density value and the minimum density value, and outputs the resultant value to the allotment ratio determination unit 306.

The maximum density value detecting unit 303, the minimum density value detecting unit 304, and the difference density value detecting unit 305 function as the calculation unit 300 that calculates the maximum density and the minimum density in a pixel block constituted from a prescribed number of pixels including pixel-of-interest data in multi-level image data.

The allotment ratio determination unit 306 determines allotment ratios for the pixel of interest 308 with reference to an allotment ratio table 307, based on the minimum density value MIN and the difference density value DIFF, and outputs the allotment ratio instruction information 108. Note that the details of this allotment ratio determination processing are described later.

By performing the above processing every time image data is inputted from the signal lines 204a to 204c, it is possible to sequentially calculate the maximum density value MAX, the minimum density value MIN, and the difference density value DIFF of a 3×3 pixel region having the pixel of interest 308 in the center.

As described above, in a case of using a dither processing method, jaggies and moires often occur due to interference with an input image. Also, in a case of using an error diffusion method, although occurrence of moires and jaggies can be suppressed, fringe patterns and granular noise will often occur. Furthermore, these factors causing deterioration of image quality cannot be eliminated by merely switching between a dither processing method and an error diffusion method based on a threshold value and performing output.

APPLICATION EXAMPLE 1

Figure 4A:
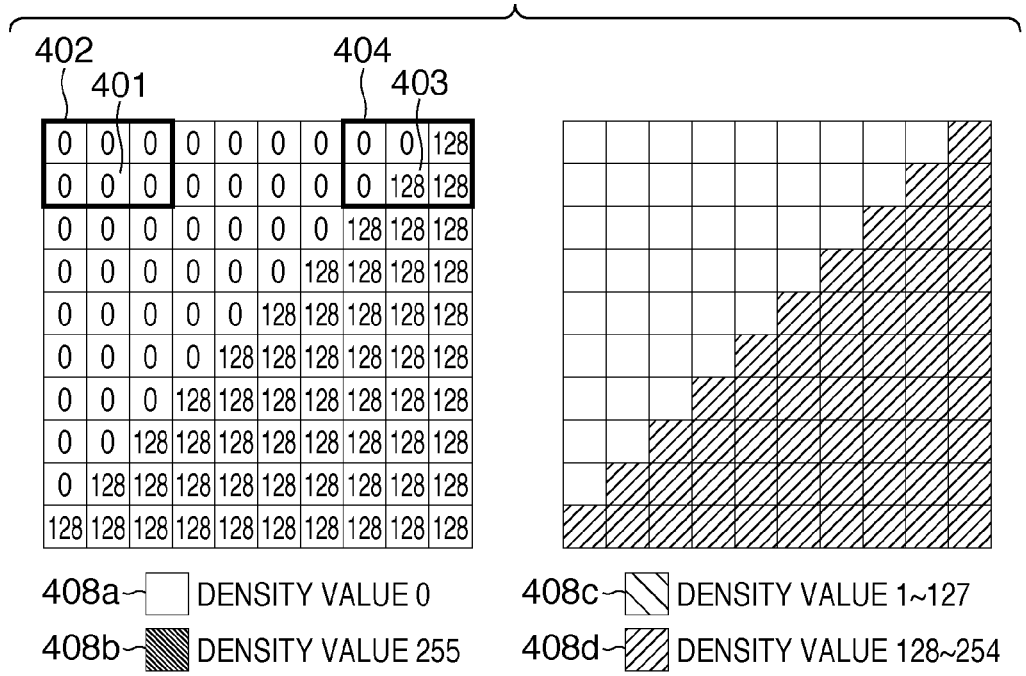
FIG. 4A is a diagram showing an example of input image data according to Application Example 1.
Figure 4B:
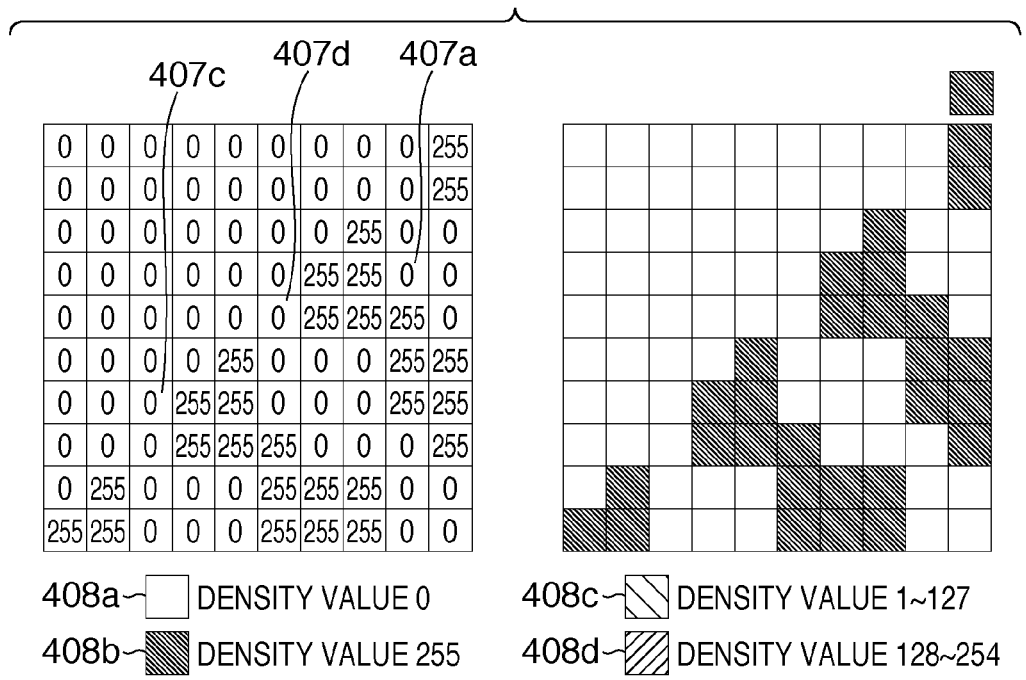
FIG. 4B is a diagram showing image data obtained by performing dither processing on the input image data shown in FIG. 4A.
Figure 4C:
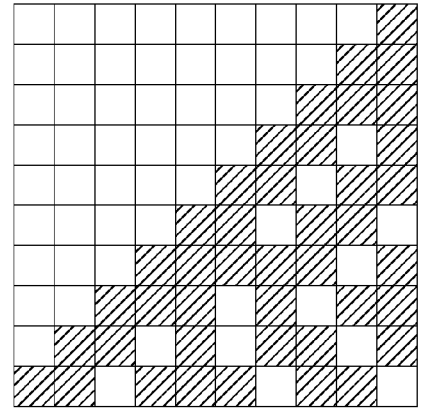
FIG. 4C is a diagram showing image data obtained by performing error diffusion processing on the input image data shown in FIG. 4A.
Figure 4D:
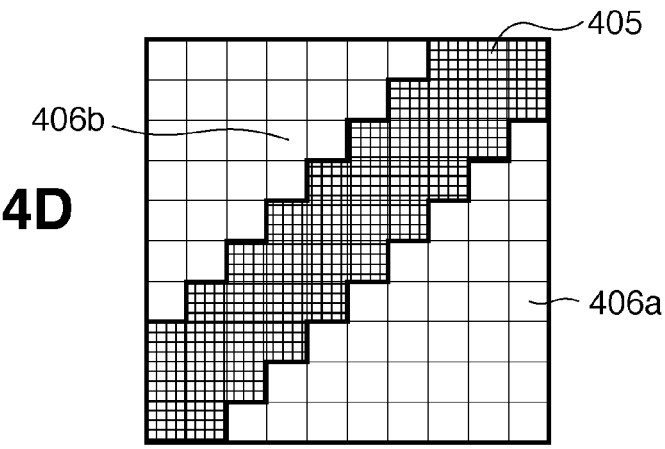
FIG. 4D is a diagram showing the result of region division by performing fixed threshold value processing.
Figure 4E:
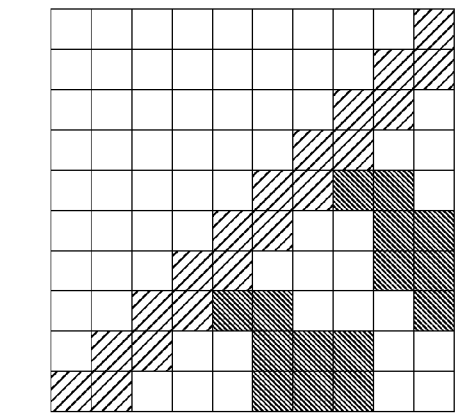
FIG. 4E is a diagram showing output image data.

FIG. 4A is a diagram showing an example of input image data according to Application Example 1. FIG. 4B is a diagram showing image data obtained by performing dither processing on the input image data shown in FIG. 4A. FIG. 4C is a diagram showing image data obtained by performing error diffusion processing on the input image data shown in FIG. 4A. FIG. 4D is a diagram showing the result of region division by performing fixed threshold value processing. FIG. 4E is a diagram showing output image data.

One square in FIG. 4A to FIG. 4E expresses one pixel, and the number written in each square expresses a density value of each pixel. Further, for each pixel in image data, a pixel having a density value 0 is expressed using the pixel image shown by reference numeral 408a as a white pixel, and a pixel having a density value 255 is expressed using the pixel image shown by reference numeral 408b as a black pixel. As for density values of halftones other than these, a pixel having a density value 1 to 127 is expressed using the pixel image shown by reference numeral 408c, and a pixel having a density value 128 to 254 is expressed using the pixel image shown by reference numeral 408d. The same follows for the subsequent diagrams as well.

As described above, the input image data shown in FIG. 4A is accumulated in the buffer 102, and thereafter inputted to the dither processing unit 103, the error diffusion processing unit 104, and the allotment ratio determination unit 105. The image data shown in FIG. 4B is obtained by performing dither processing on the input image data in the dither processing unit 103. In a case of using a dither processing method, as shown by reference numerals 407a to 407c, it can be seen that jaggies occur due to breaks in an edge portion.

The image data shown in FIG. 4C is obtained by performing error diffusion processing on the input image data in the error diffusion processing unit 104. In a case of using an error diffusion method, breaks in an edge portion do not occur, which can suppress occurrence of jaggies, but dot omission randomly occurs in the image, which generates a fringe pattern that causes deterioration of image quality.

Further, as described above, for each pixel of the input image data, the allotment ratio determination unit 105 sets the pixel as the pixel of interest, and sequentially calculates the maximum density value MAX, the minimum density value MIN, and the difference density value DIFF in a 3×3 peripheral pixel region around the pixel of interest.

For example, if a pixel 401 is the pixel of interest, the maximum density value MAX, the minimum density value MIN, and the difference density value DIFF of pixels that exist in a 3×3 pixel region 402 are calculated. In this case, since all the density values in the pixel region 402 are 0, the maximum density value MAX=0, the minimum density value MIN=0, and the difference density value DIFF=0.

On the other hand, if a pixel 403 is the pixel of interest, since pixels having a density value 128 and pixels having a density value 0 exist in a 3×3 pixel region 404, the maximum density value MAX=128, the minimum density value MIN=0, and the difference density value DIFF=128. Here, although examples of two pixels are shown, similar calculation is performed for other pixels.

Next, assuming that an edge detection threshold value TH=128, a pixel of interest whose DIFF≧TH is set as an edge pixel, and a pixel of interest whose DIFF<TH is set as a non-edge pixel, and region division is performed such that a region constituted by edge pixels is set as an edge region, and a region constituted by non-edge pixels is set as a non-edge region. Hereinafter, this processing is referred to as fixed threshold value processing.

In FIG. 4D, reference numeral 405 denotes an edge region and reference numerals 406a and 406b denote non-edge regions.

In FIG. 4E, for the edge region 405, the image processed by the error diffusion processing unit 104 shown in FIG. 4C is outputted. On the other hand, for the non-edge regions 406a and 406b, an output image is formed by switching processing for each region such that the image processed by the dither processing unit 103 shown in FIG. 4B is outputted. It can be seen that the image formed is a favorable image that does not have breaks in the edge portion as shown by reference numerals 407a to 407c, or random dot omission shown in FIG. 4C.

APPLICATION EXAMPLE 2

Figure 5A:
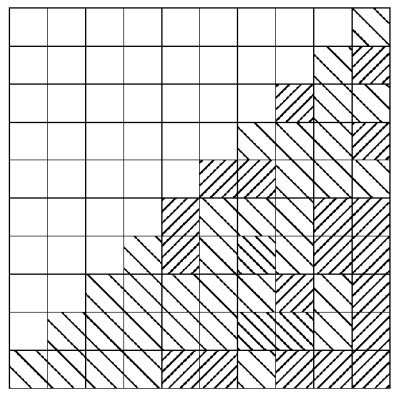
FIG. 5A is a diagram showing an example of input image data according to Application Example 2.
Figure 5B:
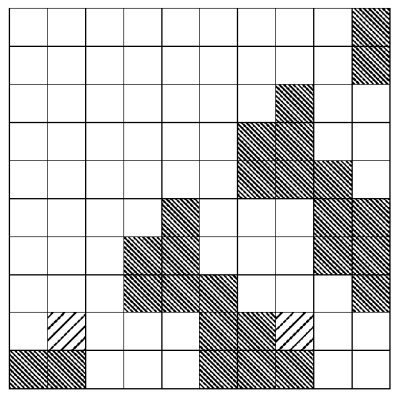
FIG. 5B is a diagram showing image data obtained by performing dither processing on the input image data shown in FIG. 5A.
Figure 5C:
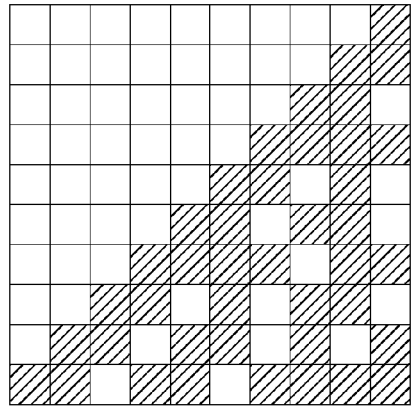
FIG. 5C is a diagram showing image data obtained by performing error diffusion processing on the input image data shown in FIG. 5A.
Figure 5D:
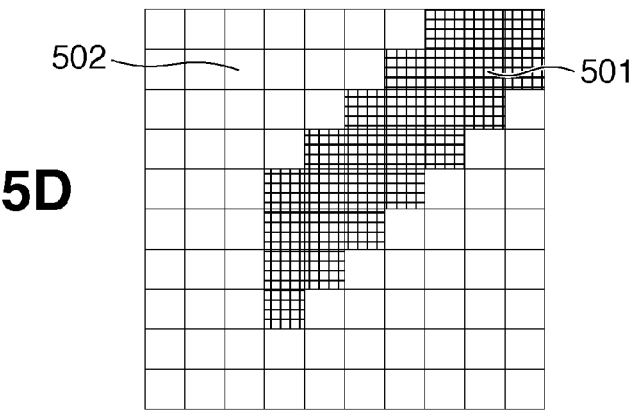
FIG. 5D is a diagram showing the result of region division by performing fixed threshold value processing.
Figure 5E:
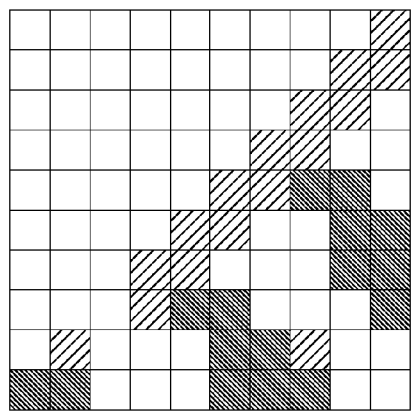
FIG. 5E is a diagram showing output image data.

FIG. 5A is a diagram showing an example of input image data according to Application Example 2. FIG. 5B is a diagram showing image data obtained by performing dither processing on the input image data shown in FIG. 5A. FIG. 5C is a diagram showing image data obtained by performing error diffusion processing on the input image data shown in FIG. 5A. FIG. 5D is a diagram showing the result of region division by performing fixed threshold value processing. FIG. 5E is a diagram showing output image data.

Next, consider processing for the input image shown in FIG. 5A. Although the input image data shown in FIG. 4A is image data having uniform pixel density values, the input image data shown in FIG. 5A has some variation in pixel the density values. Generally, such variation in density values is seen in tone images such as photographic images, and input images from an original reader.

In FIG. 5B, an example of an image obtained by processing the input image data shown in FIG. 5A in the dither processing unit 103 is shown. In FIG. 5C, an example of an image obtained by processing the input image data shown in FIG. 5A in the error diffusion processing unit 104 is shown. In FIG. 5D, an example is shown that is obtained by performing region division into an edge region 501 and a non-edge region 502 on the input image data shown in FIG. 5A using fixed threshold value processing similar to the above-described processing, with the edge detection threshold value TH=128 being set.

As described above, since the image data shown in FIG. 5A shows variation in the pixel density values, it can be seen that if the difference density value DIFF of each pixel of interest does not exceed the edge detection threshold value TH=128 even a little, the pixel is classified as a non-edge region.

Similar to FIG. 4E, FIG. 5E shows an example of an output image formed by switching processing for each region, such that an image processed by the error diffusion processing unit 104 is outputted for the edge region 501, and an image processed by the dither processing unit 103 is outputted for the non-edge region 502.

In a pixel 503 classified as a non-edge region, it can be seen that a break in the edge portion at the pixel 503 is not corrected. As shown in this example, in processing for switching between dither processing and error diffusion processing based on a threshold value, there is a possibility that processing may be switched due to slight variations in densities of image data, which causes deterioration of image quality. Although this deterioration of image quality can be avoided to some extent by setting the edge detection threshold value TH to a suitable value according to an image, it is difficult to determine suitable threshold values for all arbitrary images, thus requiring the addition of complicated processing.

Since this problem is caused by digitally switching processing, occurrence of such a problem can be suppressed by gradually changing switching from a dither processing method to an error diffusion method, or switching from an error diffusion method to a dither processing method.

A feature of the present embodiment is that an allotment ratio of a dither processing method and an allotment ratio of an error diffusion method are determined, and according to these allotment ratios, processing for compositing an image on which tone reproduction has been performed using a dither processing method, and an image on which tone reproduction has been performed using an error diffusion method, and outputting the resultant image (hereinafter, referred to as composite processing) is performed.

It is possible to gradually change switching between a dither processing method and an error diffusion method by outputting the above image on which composite processing has been performed in a portion where processing is switched, and gradually changing the allotment ratios, which are ratios for composite processing. Also, a feature of the present embodiment is that processing for further reducing jaggies in an image drawn on a ground is performed. Details are described below.

Figure 6A:
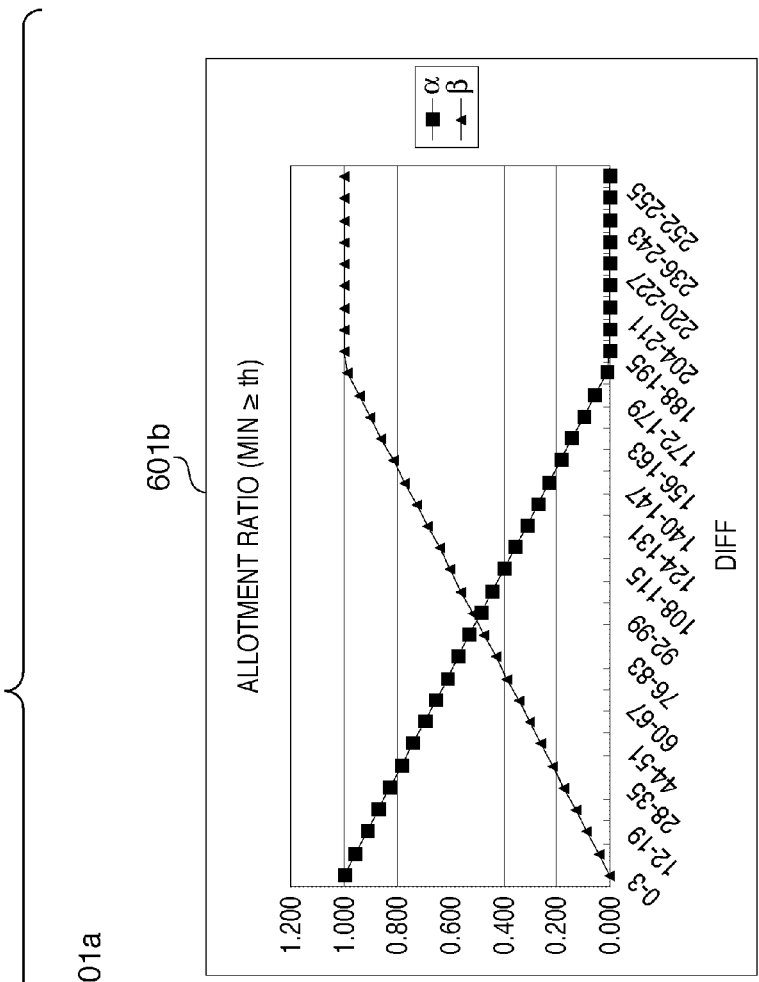
FIGS. 6A and 6B are diagrams showing examples of an allotment ratio table 307.
Figure 6B:
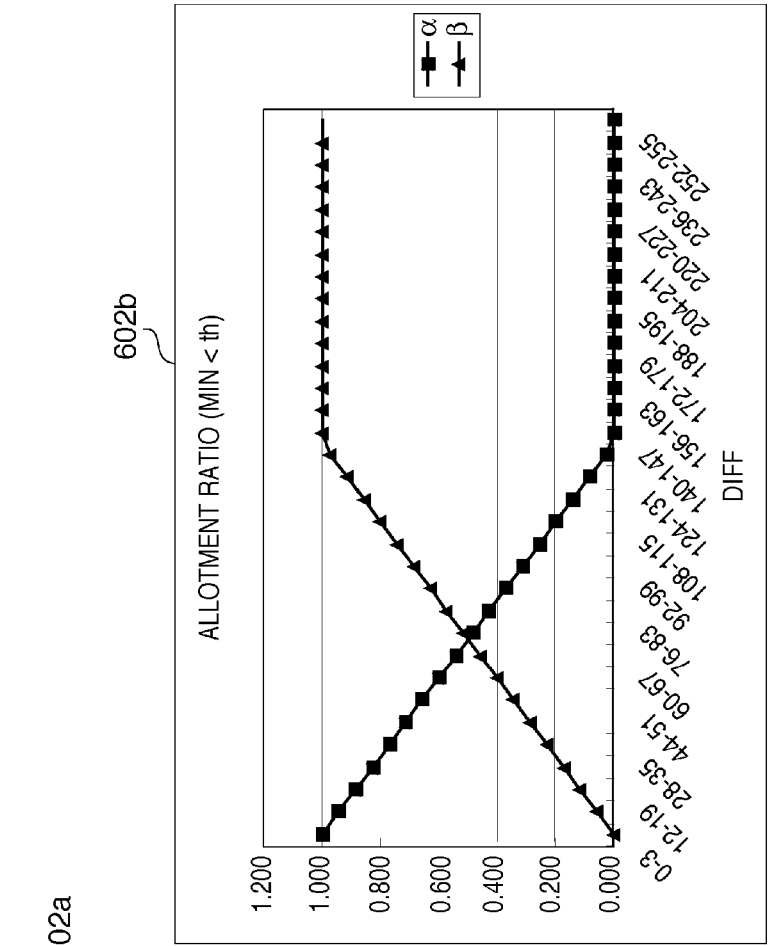

FIGS. 6A and 6B are diagrams showing examples of the allotment ratio table 307. The allotment ratio determination unit 306 has an allotment ratio table 601a (first table) and an allotment ratio table 602a (second table) that store allotment ratios that are in accordance with the difference between the maximum density and the minimum density.

The allotment ratio table 601a is a table used in a case in which the minimum density is greater than or equal to a threshold value set in advance. The allotment ratio table 602a is a table used in a case in which the minimum density is smaller than the threshold value. The allotment ratio table 602a stores allotment ratios for an error diffusion method that are greater than those in the allotment ratio table 601a.

If the minimum density value MIN is greater than or equal to the threshold value (MIN≧th), the allotment ratio determination unit 306 refers to the allotment ratio table 601a. For example, if the difference density value DIFF of a pixel of interest is 0 to 3, it is determined that the allotment ratio α of a dither processing method=1.000, and the allotment ratio β of an error diffusion method=0, and if the difference density value DIFF of a pixel of interest is 4 to 11, it is determined that the allotment ratio α of a dither processing method=0.957, and the allotment ratio β of an error diffusion method=0.043.

On the other hand, if the minimum density value MIN is smaller than the threshold value (MIN<th), the allotment ratio determination unit 306 refers to the allotment ratio table 602a. For example, if the difference density value DIFF of a pixel of interest is 0 to 3, it is determined that the allotment ratio α of a dither processing method=1.000, and the allotment ratio β of an error diffusion method=0, and if the difference density value DIFF of a pixel of interest is 4 to 11, it is determined that the allotment ratio α of a dither processing method=0.943, and the allotment ratio β of an error diffusion method=0.057.

Reference numeral 601b denotes a graph corresponding to the allotment ratio table 601a, and reference numeral 602b denotes a graph corresponding to the allotment ratio table 602a. The graphs 601b and 602b show that the allotment ratio β of an error diffusion method becomes greater as DIFF becomes greater. As is clear from the comparison between the graph 601b and the graph 602b, it can be seen that the allotment ratio β of an error diffusion method is greater in a case in which MIN is smaller than the threshold value th (MIN<th), compared with a case in which MIN is greater than or equal to the threshold value (MIN≧th).

The allotment ratio α of a dither processing method and the allotment ratio β of an error diffusion method have a relationship shown by the following Equation 1-1.

$$\alpha+\beta=1 \qquad \text{Equation 1-1}$$

As the allotment ratio instruction information 108 outputted to the composition unit 109, two types of ratios, namely the allotment ratio α of a dither processing method and the allotment ratio β of an error diffusion method, may be outputted, or only the allotment ratio α of a dither processing method is outputted, and the allotment ratio β of an error diffusion method may be obtained by calculating β=1−α using Equation 1-1. Although in the present embodiment, the allotment ratio is determined with reference to an allotment ratio table, a method of determining an allotment ratio using a mathematical expression may be used, for example.

Furthermore, in the present embodiment, although the allotment ratio table is switched depending on whether the minimum density value MIN is greater than or equal to the threshold value (MIN≧th), or smaller than the threshold value th (MIN<th), as another example, a configuration may be adopted in which the allotment ratio table is switched using object information from a computer or a controller.

For example, assuming that it is possible to distinguish between a character region, a graphics region, and a photographic region in image data using object information, by using an allotment ratio table according to which the allotment ratio β of an error diffusion method is greater for a character region and a graphics region than for a photographic region, it is possible to more effectively suppress jaggies in a graphics region, such as a character region or a thin line.

The composition unit 109 shown in FIG. 1 receives an input of the image data 106 obtained by performing tone reproduction using a dither processing method from the dither processing unit 103. Also, the image data 107 obtained by performing tone reproduction using an error diffusion method is received as input from the error diffusion processing unit 104. Furthermore, the allotment ratio instruction information 108 is received as input from the allotment ratio determination unit 105.

The composition unit 109 determines an output pixel density value O of output image data according to the following Equation 1-2 for each pixel of interest. Note that D is a pixel density value of an image obtained by performing tone reproduction on a pixel of interest through dither processing, and E is a pixel density value of an image obtained by performing tone reproduction on a pixel of interest through error diffusion processing. Further, α and β are an allotment ratio of a dither processing method and an allotment ratio of an error diffusion method that are described above.

$$O=\alpha \times D + \beta \times E \qquad \text{Equation 1-2}$$

Using Equation 1-2, the image data 106 on which dither processing has been performed, and the image data 107 on which error diffusion processing has been performed are composited, according to the allotment ratios. As shown by Equation 1-1, since the sum of the allotment ratio α of a dither processing method and the allotment ratio β of an error diffusion method is 1, the density of an image is saved even after data pieces are composited.

Figure 7A:
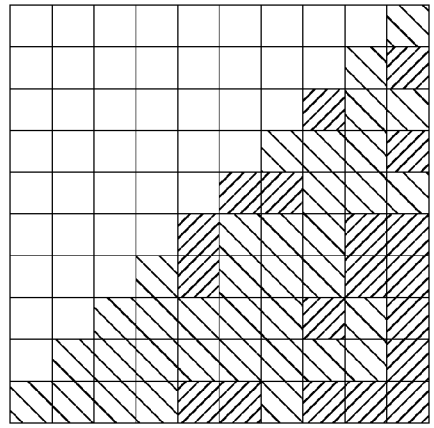
FIG. 7A is a diagram showing an example of input image data according to Application Example 2.
Figure 7B:
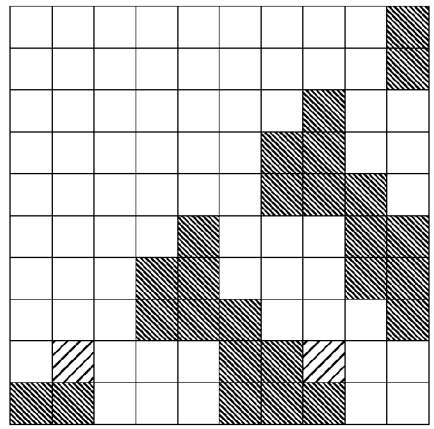
FIG. 7B is a diagram showing image data obtained by performing dither processing on the input image data shown in FIG. 7A.
Figures 7C, 7D, 7E:
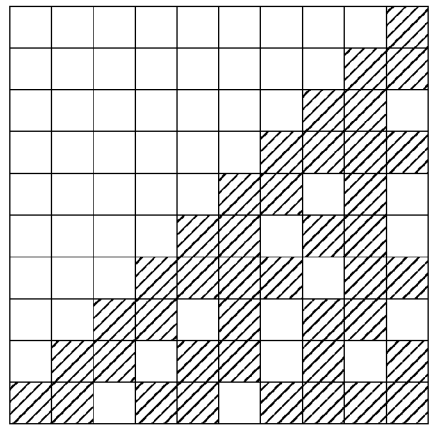
FIG. 7C is a diagram showing image data obtained by performing error diffusion processing on the input image data shown in FIG. 7A.
FIG. 7D is a diagram showing a maximum density value MAX for each pixel.
FIG. 7E is a diagram showing a minimum density value MIN for each pixel.
Figures 7F, 7G, 7H:
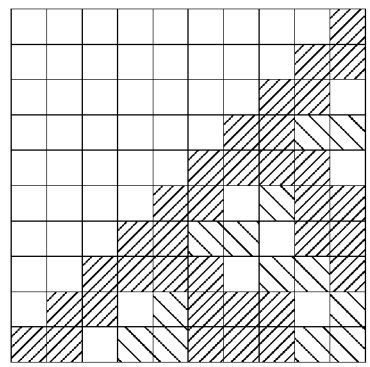
FIG. 7F is a diagram showing difference density values DIFF.
FIG. 7G is a diagram showing an example in which an allotment ratio α of a dither processing method has been determined for each pixel.
FIG. 7H is a diagram showing output image data.

The above processing is applied to the input image data shown in FIG. 5A. FIG. 7A is a diagram showing an example of input image data according to Application Example 2. FIG. 7B is a diagram showing image data obtained by performing dither processing on the input image data shown in FIG. 7A. FIG. 7C is a diagram showing image data obtained by performing error diffusion processing on the input image data shown in FIG. 7A. FIG. 7D is a diagram showing the maximum density value MAX for each pixel. FIG. 7E is a diagram showing the minimum density value MIN for each pixel. FIG. 7F is a diagram showing the difference density values DIFF. FIG. 7G is a diagram showing an example in which an allotment ratio α of a dither processing method has been determined for each pixel. FIG. 7H is a diagram showing output image data. Note that FIG. 7A to FIG. 7C show the same image data as that in FIG. 5A to FIG. 5C.

For example, assuming that a pixel 701 is a pixel of interest, in a 3×3 pixel region 702 having the pixel 701 in the center, the maximum density value MAX is 131 (Dec) as shown in a pixel 703, and the minimum density value MIN is 117 (Dec) as shown in a pixel 704. The difference density value DIFF is 14 (Dec), which is shown in a pixel 705.

Next, the allotment ratios α and β are determined using the minimum density value MIN and the difference density value DIFF. Note that it is assumed that th=20 (Dec). Using the pixel 701 as an example, MIN is 117 (Dec), which is greater than th, and accordingly the allotment ratio table 601*a* shown in FIG. 6A is used. Since DIFF is 14 (Dec), it is determined that α=0.914 and β=0.086. An example in which a has been determined for each pixel in FIG. 7A is shown in FIG. 7G.

Next, an output pixel density value is calculated using Equation 1-2 described above. An output pixel density value O for the pixel 701 can be calculated as shown by the following equation, from a pixel density value D=0 after a dither processing shown in a pixel 706, and a pixel density value E=192 after error diffusion processing shown in a pixel 707.

$$O=\alpha \times D+\beta \times E=0.914\times0+0.086\times192\approx16(\text{Dec})$$

By calculating an output pixel density value for other pixels as well in a similar way, output image data is obtained as shown in FIG. 7H. This shows that breaks in the edge portion and jaggies can be suppressed, which makes it possible to form a favorable image.

APPLICATION EXAMPLE 3

Figure 8A:
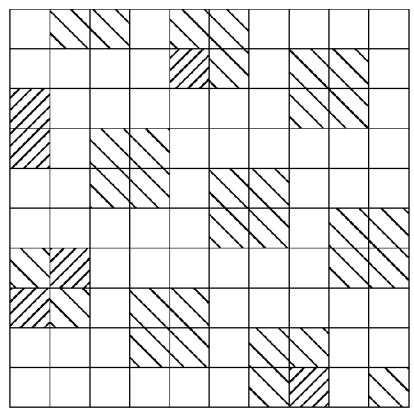
FIG. 8A is a diagram showing an example of input image data according to Application Example 3.
Figure 8B:
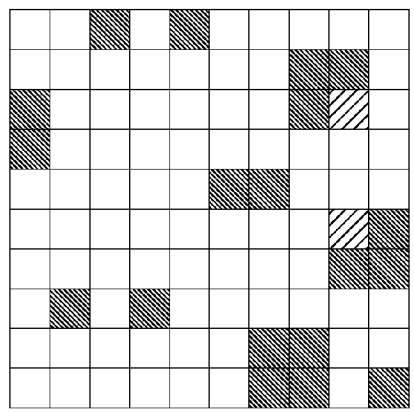
FIG. 8B is a diagram showing image data obtained by performing dither processing on the input image data shown in FIG. 8A.
Figure 8C:
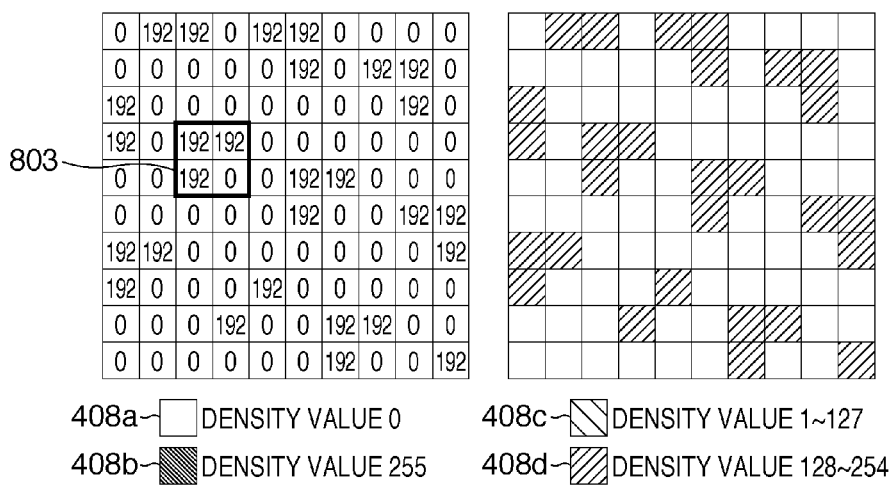
FIG. 8C is a diagram showing image data obtained by performing error diffusion processing on the input image data shown in FIG. 8A.
Figure 8D:
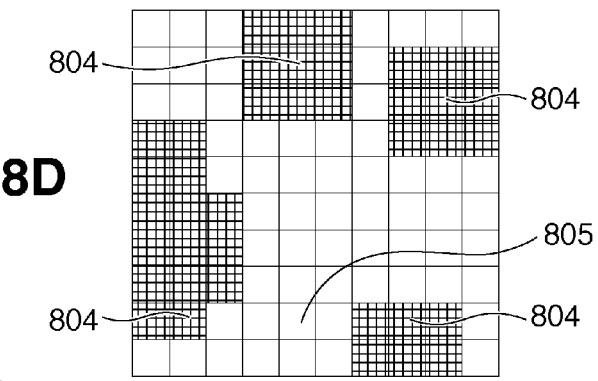
FIG. 8D is a diagram showing the result of region division by performing fixed threshold value processing.
Figure 8E:
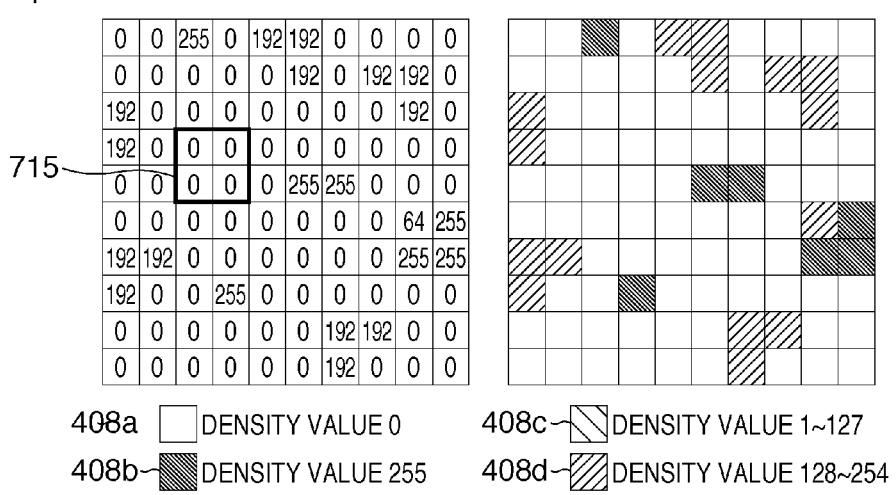
FIG. 8E is a diagram showing output image data.

FIG. 8A is a diagram showing an example of input image data according to Application Example 3. FIG. 8B is a diagram showing image data obtained by performing dither processing on the input image data shown in FIG. 8A. FIG. 8C is a diagram showing image data obtained by performing error diffusion processing on the input image data shown in FIG. 8A. FIG. 8D is a diagram showing the result of region division by performing fixed threshold value processing. FIG. 8E is a diagram showing output image data.

Input image data shown in FIG. 8A is constituted from a cyclic pattern image. An image obtained by the dither processing unit 103 performing tone reproduction on the input image data is shown in FIG. 8B.

If dither processing is performed on image data having a cycle such as the input image data shown in FIG. 8A, a moire phenomenon may occur due to interference. For example, although pixels having a density value 119 to 127 exist in a region 801, all density values are 0 in a region 802 corresponding to the image data after dither processing. If such a state occurs cyclically, a cyclic fringe pattern called a moire phenomenon occurs, which causes deterioration of image quality.

If tone reproduction is performed on the input image data shown in FIG. 8A by the error diffusion processing unit 104, an image shown in FIG. 8C can be obtained. Interference does not occur if error diffusion processing is used as shown in a region 803. Assuming that an edge detection threshold value TH=128, and using fixed threshold value processing described above, as shown in FIG. 8D, region division into an edge region 804 and a non-edge region 805 is performed on the input image data shown in FIG. 8A.

An output image shown in FIG. 8E is formed by switching processing for each region such that an image processed by the error diffusion processing unit 104 shown in FIG. 8C is outputted for the edge region 804, and an image processed by the dither processing unit 103 shown in FIG. 8B is outputted for the non-edge region 805.

As shown in FIGS. 8D and 8E, it can be seen that the region 801 has become a non-edge region, and the density value of the region 802, which is an image obtained by performing tone reproduction in the dither processing unit 103, has been outputted. Therefore, it can be seen that the moire phenomenon could not be avoided. Accordingly, in the present invention, composition is performed as follows.

Figure 9A:
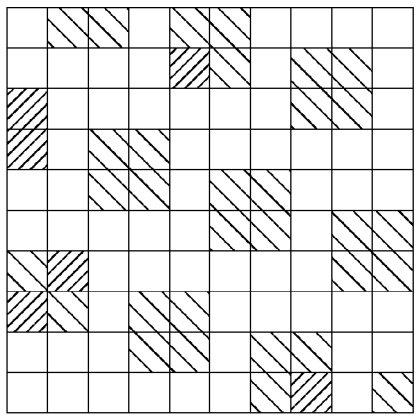
FIG. 9A is a diagram showing an example of input image data according to Application Example 3.
Figure 9B:
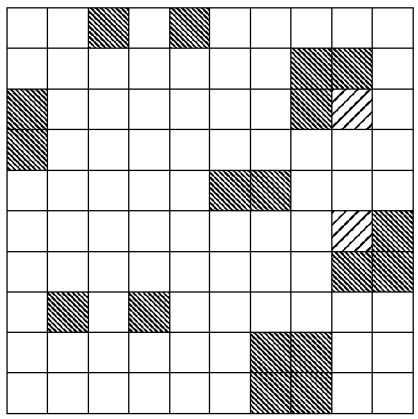
FIG. 9B is a diagram showing image data obtained by performing dither processing on the input image data shown in FIG. 9A.
Figures 9F, 9G, 9H:
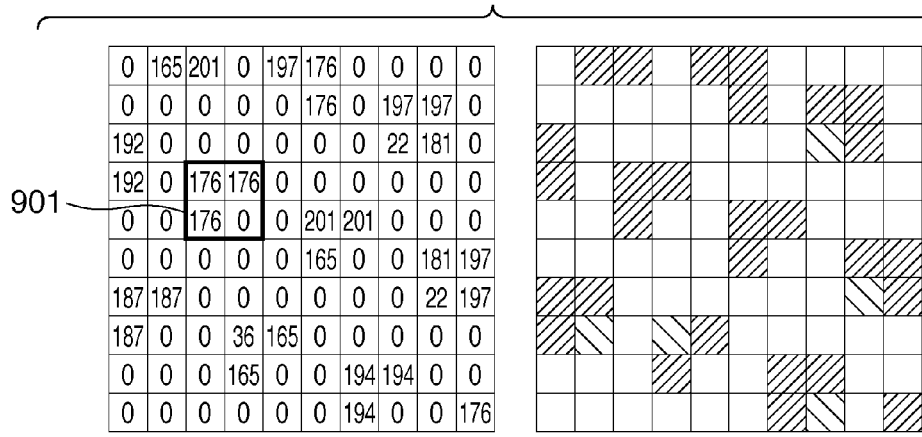
FIG. 9F is a diagram showing difference density values DIFF.
FIG. 9G is a diagram showing an example in which an allotment ratio α of a dither processing method has been determined for each pixel.
FIG. 9H is a diagram showing output image data.

FIG. 9A is a diagram showing an example of input image data according to Application Example 3. FIG. 9B is a diagram showing image data obtained by performing dither processing on the input image data shown in FIG. 9A. FIG. 9C is a diagram showing image data obtained by performing error diffusion processing on the input image data shown in FIG. 9A. FIG. 9D is a diagram showing the maximum density value MAX for each pixel. FIG. 9E is a diagram showing the minimum density value MIN for each pixel. FIG. 9F is a diagram showing the difference density values DIFF. FIG. 9G is a diagram showing an example in which an allotment ratio α of a dither processing method has been determined for each pixel. FIG. 9H is a diagram showing output image data. Note that FIG. 9A to FIG. 9C show the same image data as that in FIG. 8A to FIG. 8C.

For each pixel of the input image data shown in FIG. 9A, a is determined as shown in FIG. 9G. Since all the processing is performed as already described, details thereof are omitted. Using Equation 1-2 described above, output pixel density values are calculated as shown in FIG. 9H. If composition is performed, as shown in a region 901, it can be seen that interference can be suppressed and the moire phenomenon can be avoided.

Through the above processing, in an edge portion with a great difference between density values in a 3×3 pixel region including a pixel of interest, by increasing the allotment ratio β of an error diffusion method, breaks in the edge portion, jaggies, and the moire phenomenon due to interference can be suppressed. Further, deterioration of image quality can also be suppressed in the case of an input image having different densities as shown in FIG. 5A.

According to the present embodiment, as described above, without adding complicated processing, the disadvantages of a dither processing method and an error diffusion method can be removed, and deterioration of image quality can be suppressed.

Second Embodiment

In the first embodiment described above, image data after halftone processing is mixed according to allotment ratios. However, even though image data after halftone processing is formed using pixel density values with which dots can be stably formed, output image data from the composition unit 109 may include a small pixel density value as shown in a pixel 708. Accordingly, in the present embodiment, a modification for forming dots more stably is added.

Figure 13:
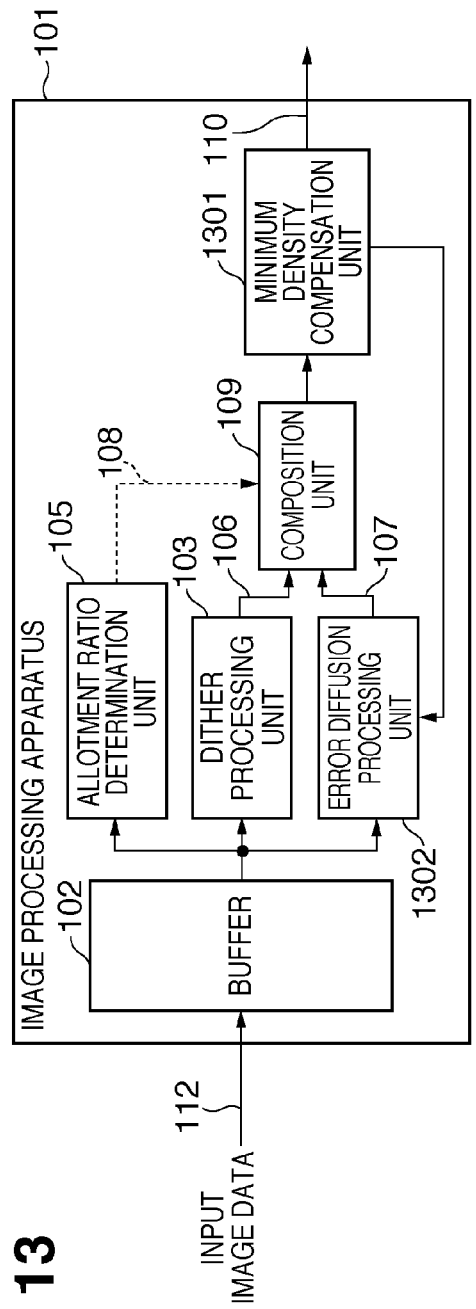
FIG. 13 is a block diagram showing the functional configuration of an image processing apparatus according to a second embodiment.

FIG. 13 is a block diagram showing the functional configuration of an image processing apparatus according to a second embodiment. An image processing apparatus 101 according to the present embodiment is further provided with a printer 111 (image forming unit) that forms an image on a recording medium based on pixel data generated by the composition unit 109, and a minimum density compensation unit 1301 that, if the value of pixel data outputted by the composition unit 109 for a pixel of interest is smaller than the minimum density value with which the printer 111 can form images, feeds back the value of pixel data to an error diffusion processing unit 1302 as an error to be allotted to the next pixel, and also outputs 0 as the density value of pixel data. Since the other constituent elements are the same as those of the first embodiment, the same reference numerals are assigned thereto, and a description thereof is omitted.

If an output density D of the composition unit 109 is a value with which the above-described dots cannot be stably formed, the minimum density compensation unit 1301 outputs that value to the error diffusion processing unit 1302, and outputs 0 to the output terminal 110. Specifically, assuming that the minimum value of the pixel density value with which dots can be stably formed is Dth, an output density Dout from the minimum density compensation unit 1301 and a correction value Dfb for the error diffusion processing unit 1302 can be expressed as shown by the following equations.

If D>Dth:Dout=D, Dfb=0

If Dth≧D:Dout=0, Dfb=D

In the error diffusion processing unit 1302, the correction value Dfb is added to input image data, and error diffusion processing is performed. Therefore, if the correction value Dfb is 0, normal error diffusion processing is performed, and if the correction value Dfb is not 0, the density value D that could not be outputted is fed back to input image data. Alternatively, a configuration is possible in which a quantization error in error diffusion processing is corrected by the density indicated by the correction value Dfb (the correction value Dfb is subtracted from the quantization error), and thereafter an error is diffused to the peripheral pixels.

According to the present embodiment, as described above, since formation of an unstable dot is eliminated by the minimum density compensation unit 1301, the disadvantages of a dither processing method and an error diffusion method can be removed, and it is possible to form a stable dot.

Third Embodiment

In the present embodiment, the present invention is applied to a case in which the input to the printer connected to the output terminal 110 is limited to M values.

Figure 14:
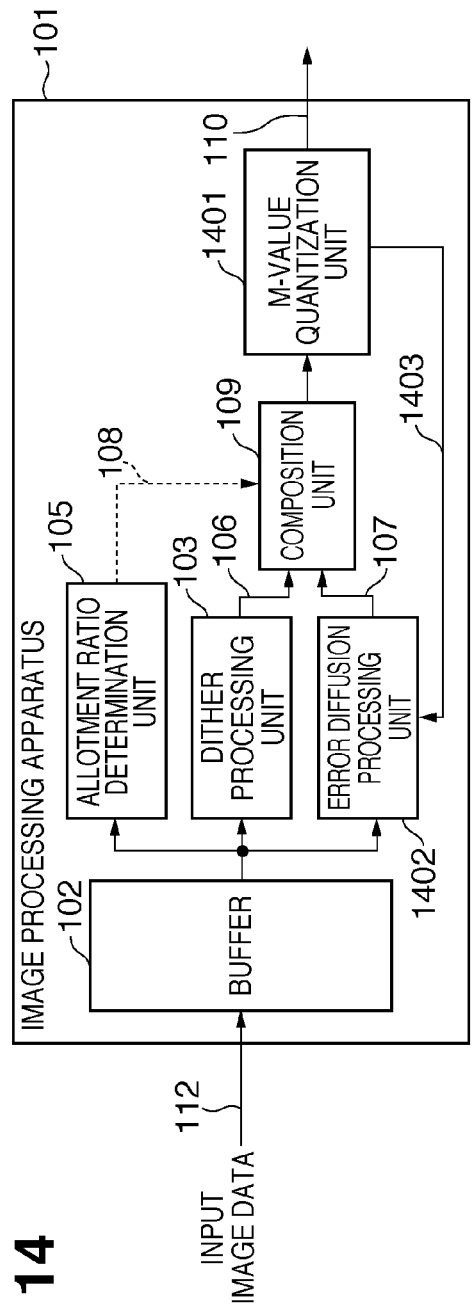
FIG. 14 is a block diagram showing the functional configuration of an image processing apparatus according to a third embodiment.

FIG. 14 is a block diagram showing the functional configuration of an image processing apparatus according to a third embodiment. Reference numeral 1401 denotes an M-value quantization unit, and reference numeral 1402 denotes an error diffusion processing unit. Since the other constituent elements are the same as those of the second embodiment, the same reference numerals are assigned thereto, and a description thereof is omitted.

The image processing apparatus according to the present embodiment is further provided with a printer 111 (image forming unit) that forms an image on a recording medium based on pixel data generated by the composition unit 109, the M-value quantization unit 1401 that quantizes the value of pixel data outputted by the composition unit 109 to a tone number of a tone to be formed by the printer 111, and a feedback unit 1403 that feeds back an error that occurred when the M-value quantization unit 1401 performs quantization, to the error diffusion processing unit 1402.

In the M-value quantization unit 1401, the output density D of the composition unit 109 is converted to an M value in conformity with the input to the printer. Then, that quantization error value is outputted to the error diffusion processing unit 1402, and the value quantized to an M value is outputted to the output terminal 110.

For example, in a case in which the connected printer is a ternary printer that can form three types of dots having densities of 0%, 50%, and 100%, the M-value quantization unit 1401 quantizes the inputted density value to 0, 128, or 255.

Normally, data after quantization is encoded and transmitted. That is, 0 is outputted from the output terminal 110 to the printer if the value is quantized to 0, 1 is outputted if the value is quantized to 128, and 2 is outputted if the value is quantized to 255. A quantization error is the difference between an input value and a quantization representative value, and this difference value is fed back to the error diffusion processing unit 1402, and density correction is performed.

Therefore, the correction value Dfb for the error diffusion processing unit 1402 and a quantization output Dq from the M-value quantization unit 1401 can be expressed as shown by the following equations.

If 0≦D<64:Dq=0,Dfb=D

If 64≦D<192:Dq=1,Dfb=D−128

If 192≦D:Dq=2,Dfb=D−255

In the error diffusion processing unit 1402, the correction value Dfb is added to input image data, and error diffusion processing is performed. Alternatively, a configuration is possible in which a quantization error in error diffusion processing is corrected by the density indicated by the correction value Dfb (since the sign of the value of the correction value Dfb is opposite to the sign of the quantization error in error diffusion processing, in this case, the correction value Dfb is subtracted from the quantization error in error diffusion processing), and thereafter an error is diffused to the peripheral pixels.

According to the present embodiment, as described above, a configuration is adopted in which the number of input levels is reduced by the M-value quantization unit 1401, and a quantization error (the density difference) due to M-value quantization is corrected through error diffusion processing, and accordingly it is possible to be also compatible with an M-value printer with a smaller number of input levels.

Fourth Embodiment

Figure 10:
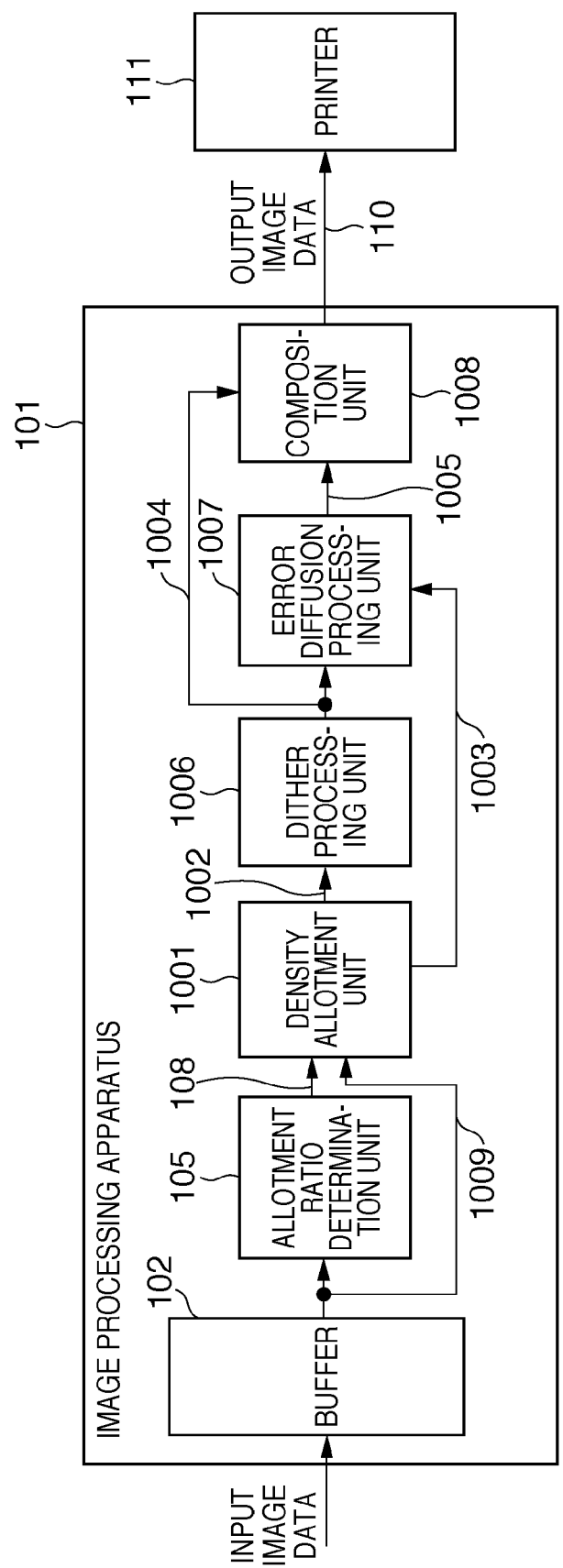
FIG. 10 is a block diagram showing the functional configuration of an image processing apparatus according to a fourth embodiment.

FIG. 10 is a block diagram showing the functional configuration of an image processing apparatus according to a fourth embodiment. Reference numeral 1001 denotes a density allotment unit, reference numeral 1006 denotes a dither processing unit, reference numeral 1007 denotes an error diffusion processing unit, and reference numeral 1008 denotes a composition unit. Since the other constituent elements are the same as those of the first embodiment, the same reference numerals are assigned thereto, and a description thereof is omitted.

In the present embodiment, the density allotment unit 1001 allots input image data according to the allotment ratios from the allotment ratio determination unit 105, and thereafter results obtained by performing different types of halftone processing respectively are composited. Based on the dither allotment ratios $\alpha$, and the error diffusion allotment ratios $\beta$, which have been determined by the allotment ratio determination unit 105, the density allotment unit 1001 allots a pixel density value PI of each pixel of input image data using Equation 4-1 and Equation 4-2. Note that DI is assumed to be the pixel value of each pixel of input image data on which dither processing has been performed by the dither processing unit 1006, and EI is assumed to be the pixel value of each pixel of input image data on which error diffusion processing has been performed by the error diffusion processing unit 1007.

$$DI = \alpha \times PI \quad \text{Equation 4-1}$$

$$EI = \beta \times PI \quad \text{Equation 4-2}$$

Pixel data of each pixel obtained using Equation 4-1 is outputted through a signal line 1002. Further, pixel data of each pixel obtained using Equation 4-2 is outputted through a signal line 1003.

The dither processing unit 1006 outputs image data DO obtained by performing tone reproduction on the pixel value DI of each pixel of input image data using dither processing method, to the error diffusion processing unit 1007 and the composition unit 1008 through a signal line 1004. The error diffusion processing unit 1007 generates image data EO obtained by performing tone reproduction on input image data EI using an error diffusion method, and here the error diffusion processing unit 1007 generates EO so as to be density values with which dots can be stably formed.

Figure 11:
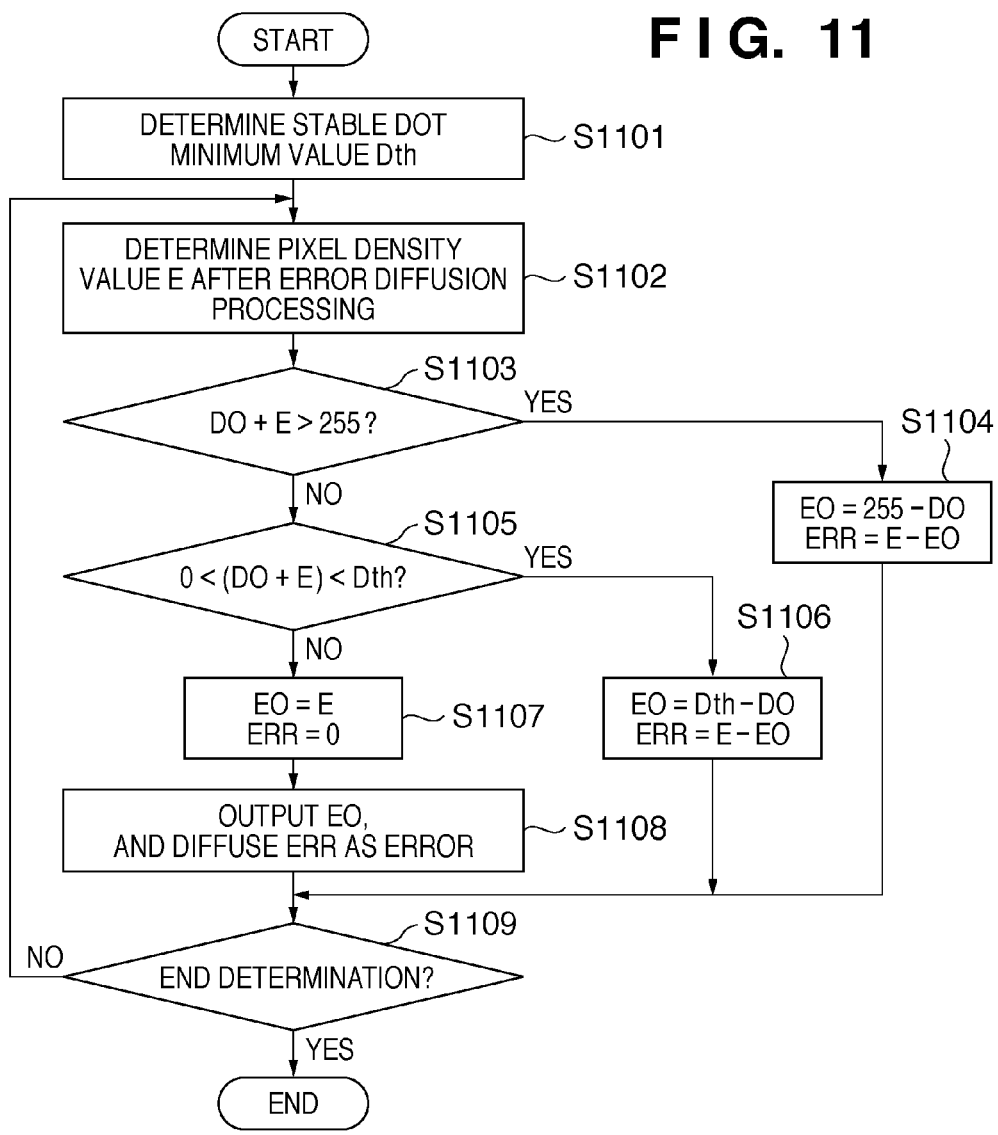
FIG. 11 is a diagram showing a processing procedure performed by an error diffusion processing unit 1007 according to the fourth embodiment.

FIG. 11 is a diagram showing a processing procedure performed by the error diffusion processing unit 1007 according to the fourth embodiment. First, in step S1101, a stable dot minimum value Dth is set as the minimum value of a pixel density value with which dots can be stably formed. The value stored in the printer in advance is used for this Dth. Next, in step S1102, a pixel density value E after error diffusion processing for input image data EI is determined. Then, in step S1103, image data DO outputted by the dither processing unit 1006 is referenced, and if DO+E>255, the following equations are calculated in step S1104.

$$EO = 255 - DO \quad \text{Equation 4-3}$$

$$ERR = E - EO \quad \text{Equation 4-4}$$

EO+DO=255 can be derived from Equation 4-3.

In the other case, if it is determined that 0<(DO+E)<Dth in step S1105, the following equations are calculated in step S1106.

$$EO = Dth - DO \quad \text{Equation 4-5}$$

$$ERR = E - EO \quad \text{Equation 4-6}$$

EO+DO=Dth can be derived from Equation 4-5.

In the other case, in step S1107, it is set that EO=E and ERR=0.

Then, in step S1108, EO is outputted as an output of the error diffusion processing unit 1007, and ERR is diffused to the peripheral pixels in addition to a normal error. Finally, in step S1109, it is determined whether processing has ended, and if the processing has not ended, it will return to step S1102, and the above series of processing is repeated.

For example, in a case in which E=192 is obtained through error diffusion processing, and DO=128 at this time, E+DO=300, which is a value greater than 255. In view of this, the output of the error diffusion processing unit 1007 is EO=255−DO=127, and ERR=E−EO=65 is diffused to the peripheral pixels in addition to a normal error.

Further, in a case in which E=32 is obtained through error diffusion processing, and DO=64 and Dth=128 at this time, E+EO=96, which is a value smaller than Dth. In this case, the output of the error diffusion processing unit 1007 is EO=Dth−DO=64, and ERR=E−EO=−32 is diffused to the peripheral pixels in addition to a normal error. The composition unit 1008 outputs an output pixel density value PO to which DO and EO that were inputted have been added, to the printer 111.

Here, since PO=DO+EO≦255 is assured by performing the processing described above, the digit overflow of image data does not occur. Similarly, since it is also assured that a value for which 0<PO<Dth is not included in PO, the output pixel density value PO can be contained in the range in which dots can be stably formed. Since a difference density value ERR between pixel density values E and EO is diffused to the peripheral pixels as an error, even after a pixel density value is corrected, the density of an output image is saved.

According to the present embodiment, as described above, the disadvantages of a dither processing method and an error diffusion method can be removed, and furthermore it is possible to form a stable dot.

Note that in the embodiments described above, although the allotment ratio determination unit 105 obtains the pixel value of each pixel of output image data from the maximum density value MAX, the minimum density value MIN, and the difference density value DIFF in 3×3 pixel regions around each pixel of input image data, it goes without saying that the object of the present invention can also be achieved even when using an allotment ratio determination method other than the method described above.

Figure 12:
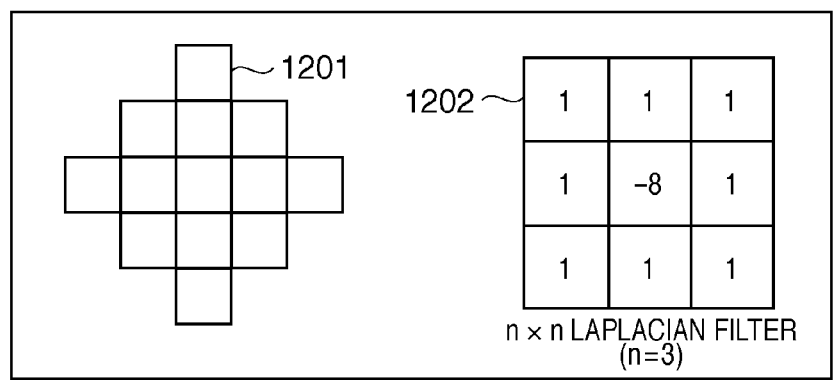
FIG. 12 is a diagram showing an example of a region shape and an example of a filter in other embodiments.

For example, in the embodiments described above, although the pixel density value of a 3×3 peripheral pixel region is used, it goes without saying that the object of the present invention can also be achieved even when determining allotment ratios based on image data in an arbitrary region, such as a 5×5 peripheral pixel region or a 7×7 peripheral pixel region, or a region having a shape as shown by reference numeral 1201 in FIG. 12.

Further, instead of the difference density value DIFF, the object can also be achieved by using the output value of the Laplacian filter having an n-pixel×n-pixel size as shown by reference numeral 1202 in FIG. 12. Further, it goes without saying that the object can also be achieved by using other filters for edge detection.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-001107, filed Jan. 6, 2009, which is hereby incorporated by reference herein in its entirety.

What is claimed is:

1. An image processing apparatus that generates output image data based on multi-level image data, comprising:
    a calculation unit configured to calculate a maximum density and a minimum density in a pixel block that includes pixel-of-interest data in the multi-level image data and that is constituted from a prescribed number of pixels;
    an error diffusion processing unit configured to generate tone pixel data from the pixel-of-interest data according to an error diffusion method;
    a dither processing unit configured to generate tone pixel data from the pixel-of-interest data according to a dither processing method;
    an allotment ratio determination unit configured to determine an allotment ratio of the error diffusion method and an allotment ratio of the dither processing method based on the maximum density and the minimum density that have been calculated by the calculation unit;
    a composition unit configured to composite the tone pixel data for a pixel of interest that has been generated by the error diffusion processing unit and the dither processing unit according to the allotment ratios determined by the allotment ratio determination unit, and output the composited data as pixel data of the output image data,
    wherein the allotment ratio determination unit increases the allotment ratio with respect to the error diffusion method as a difference between the maximum density and the minimum density increases;

an image forming unit configured to form an image on a recording medium based on the pixel data generated by the composition unit; and a minimum density compensation unit configured to, in a case in which a value of the pixel data for the pixel of interest outputted by the composition unit is smaller than a minimum density value with which the image forming unit can perform formation, feed back the value of the pixel data to the error diffusion processing unit as an error to be allotted to a next pixel, and also output 0 as a density value of the pixel data.

2. The image processing apparatus according to claim 1, wherein the allotment ratio determination unit has a first table and a second table that store the allotment ratios that are in accordance with the difference between the maximum density and the minimum density, the first table is a table used in a case in which the minimum density is greater than or equal to a threshold value set in advance, and the second table is a table used in a case in which the minimum density is smaller than the threshold value, and the second table stores an allotment ratio with respect to the error diffusion method that is greater than that in the first table.

3. An image processing method for generating output image data based on multi-level image data, comprising:

a calculation step of calculating a maximum density and a minimum density in a pixel block that includes pixel-of-interest data in the multi-level image data and that is constituted from a prescribed number of pixels;

an error diffusion processing step of generating tone pixel data from the pixel-of-interest data according to an error diffusion method;

a dither processing step of generating tone pixel data from the pixel-of-interest data according to a dither processing method;

an allotment ratio determination step of determining an allotment ratio of the error diffusion method and an allotment ratio of the dither processing method based on the maximum density and the minimum density that have been calculated in the calculation step;

a composition step of compositing the tone pixel data for a pixel of interest that has been generated in the error diffusion processing step and the dither processing step according to the allotment ratios determined in the allotment ratio determination step, and outputting the composited data as pixel data of the output image data, wherein in the allotment ratio determination step, the allotment ratio with respect to the error diffusion method is increased as a difference between the maximum density and the minimum density increases;

an image forming step of forming an image on a recording medium based on the pixel data generated in the composition step; and a minimum density compensation step of, in a case in which a value of the pixel data for the pixel of interest outputted in the composition step is smaller than a minimum density value with which formation can be performed in the image forming step, feeding back the value of the pixel data to the error diffusion processing step as an error to be allotted to a next pixel, and also outputting 0 as a density value of the pixel data.

4. The image processing method according to claim 3, wherein in the allotment ratio determination step, a first table and a second table that store the allotment ratios that are in accordance with the difference between the maximum density and the minimum density are provided, the first table is a table used in a case in which the minimum density is greater than or equal to a threshold value set in advance, and the second table is a table used in a case in which the minimum density is smaller than the threshold value, and the second table stores an allotment ratio with respect to the error diffusion method that is greater than that in the first table.

5. A non-transitory computer-readable storage medium storing a program which causes a computer to execute the method according to claim 3.

* * * * *